Aug. 18, 1942.        H. G. ALLEN        2,293,686
BAG CLOSING MACHINE
Filed Sept. 13, 1939        10 Sheets-Sheet 1
Fig. 1.
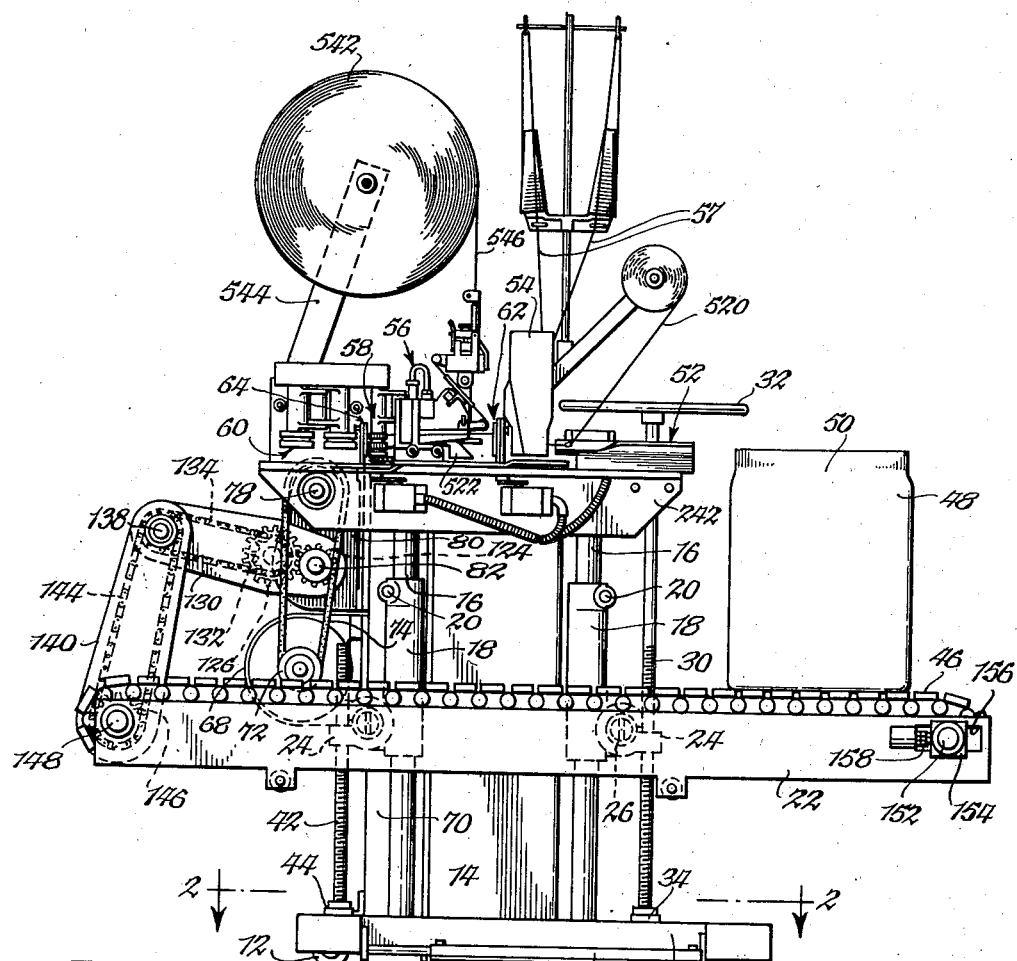
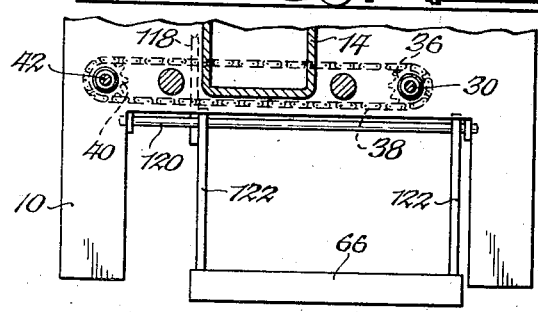
Fig. 2.
INVENTOR
Howard G. Allen
BY
ATTORNEY

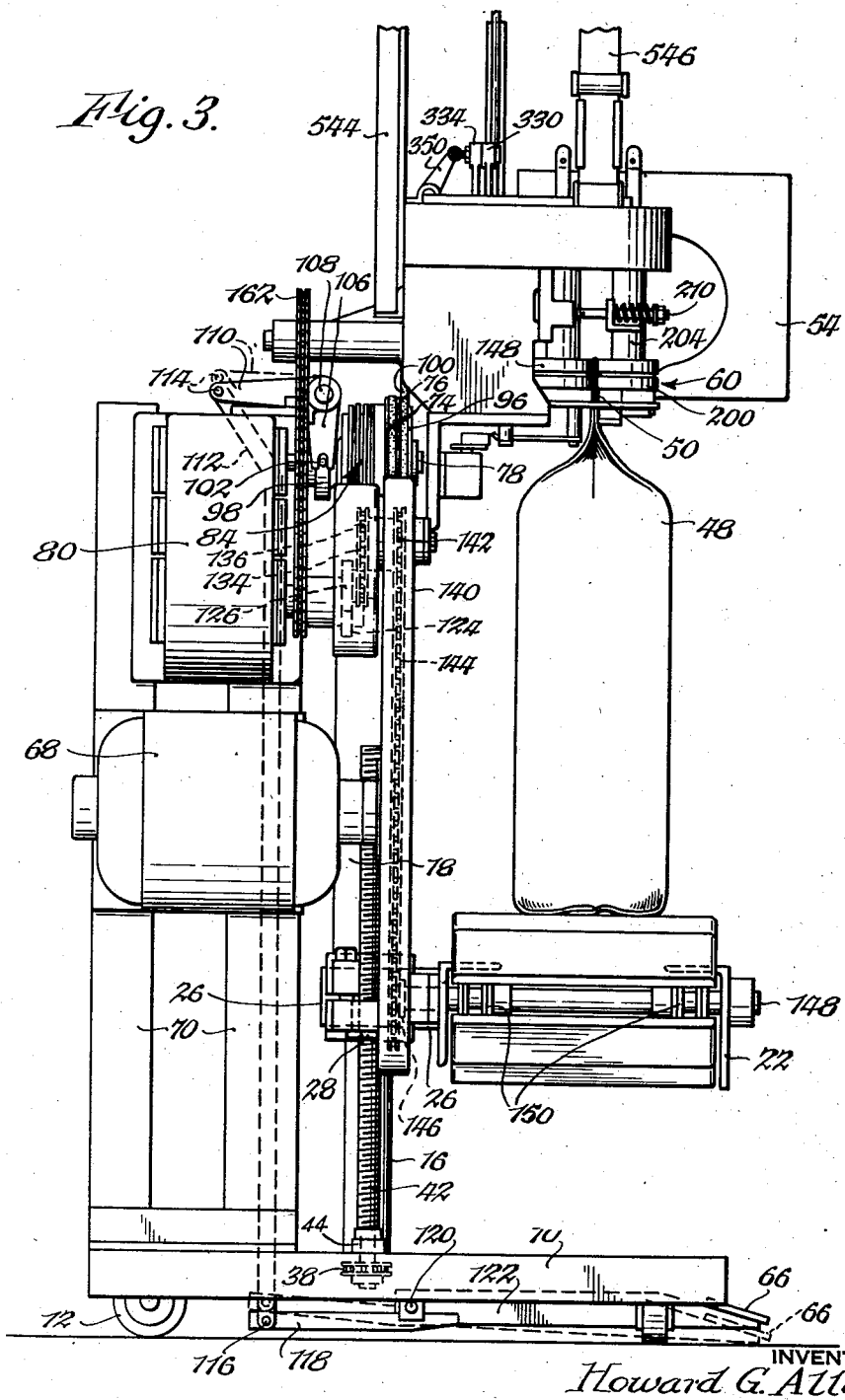

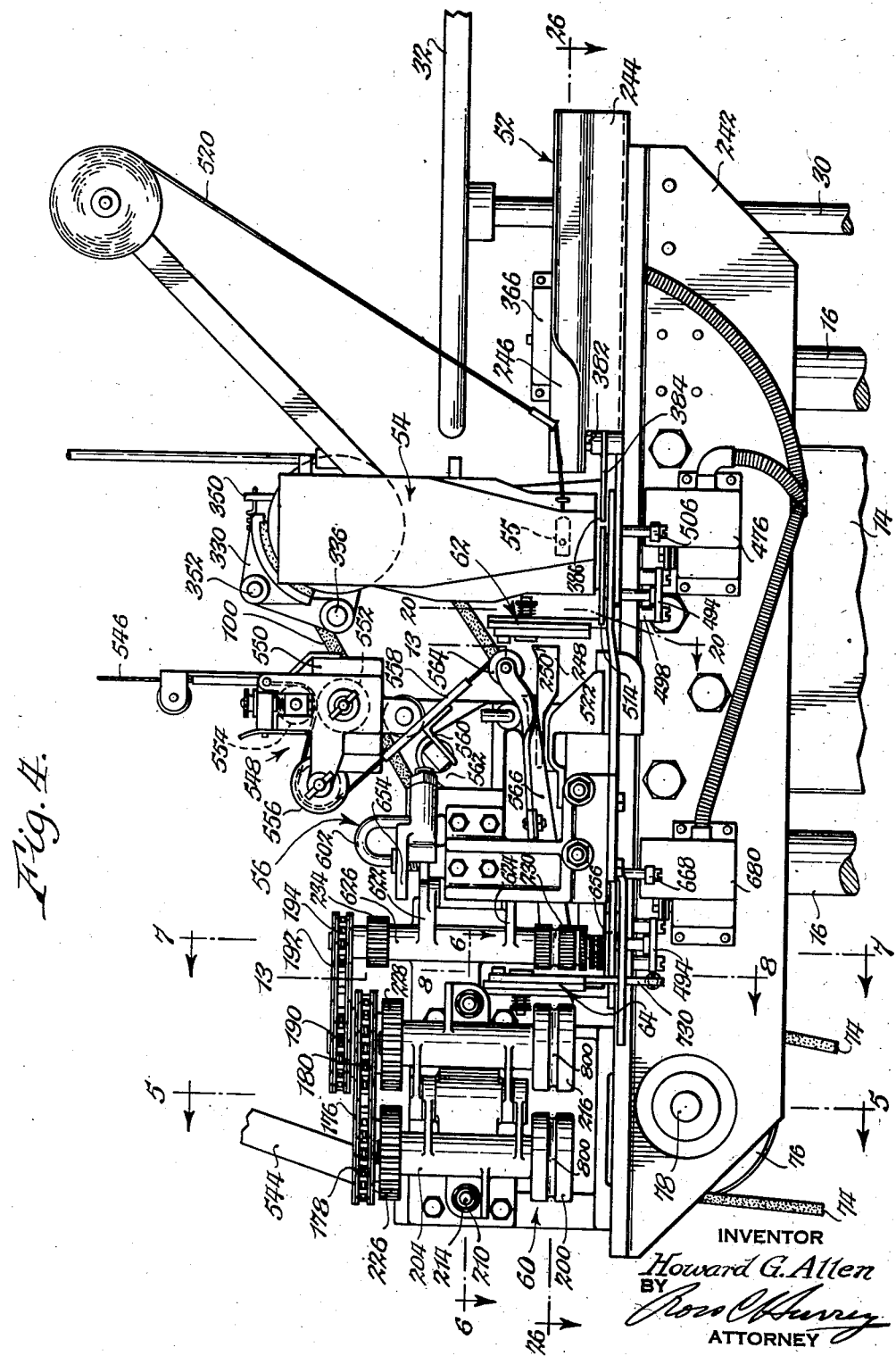

Aug. 18, 1942.   H. G. ALLEN   2,293,686
BAG CLOSING MACHINE
Filed Sept. 13, 1939   10 Sheets-Sheet 4
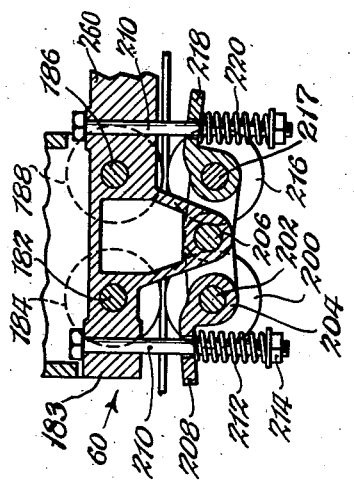
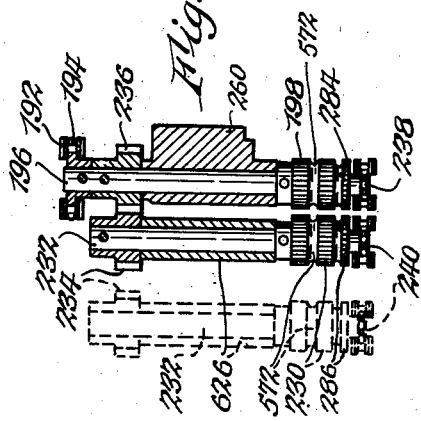
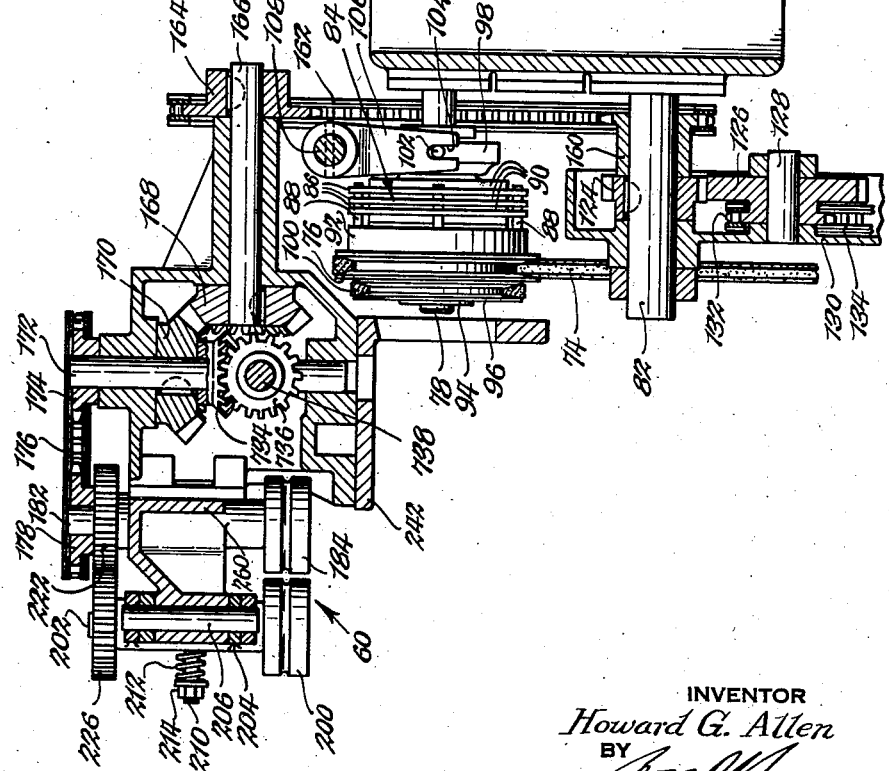
INVENTOR
Howard G. Allen
BY
ATTORNEY

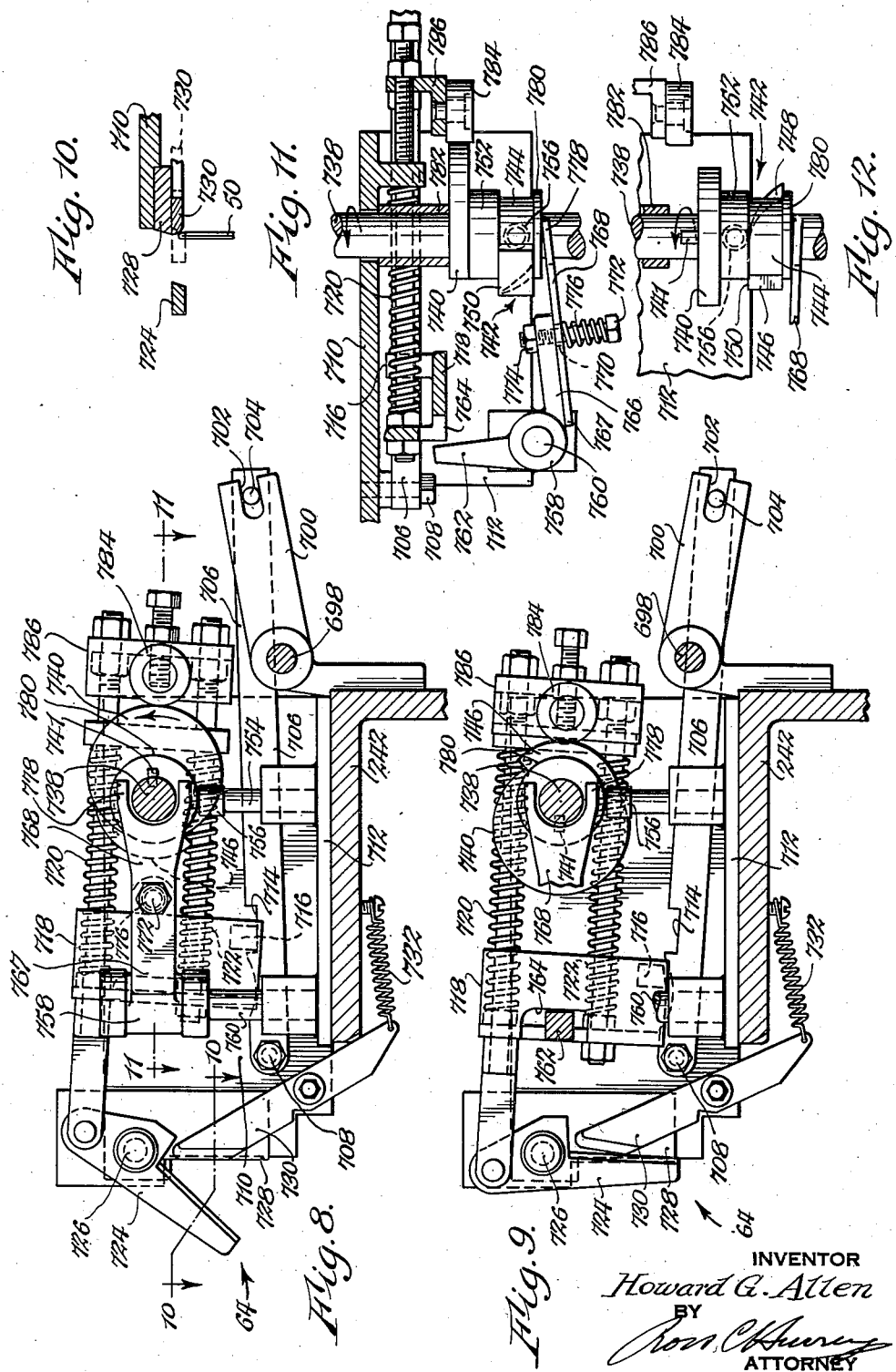

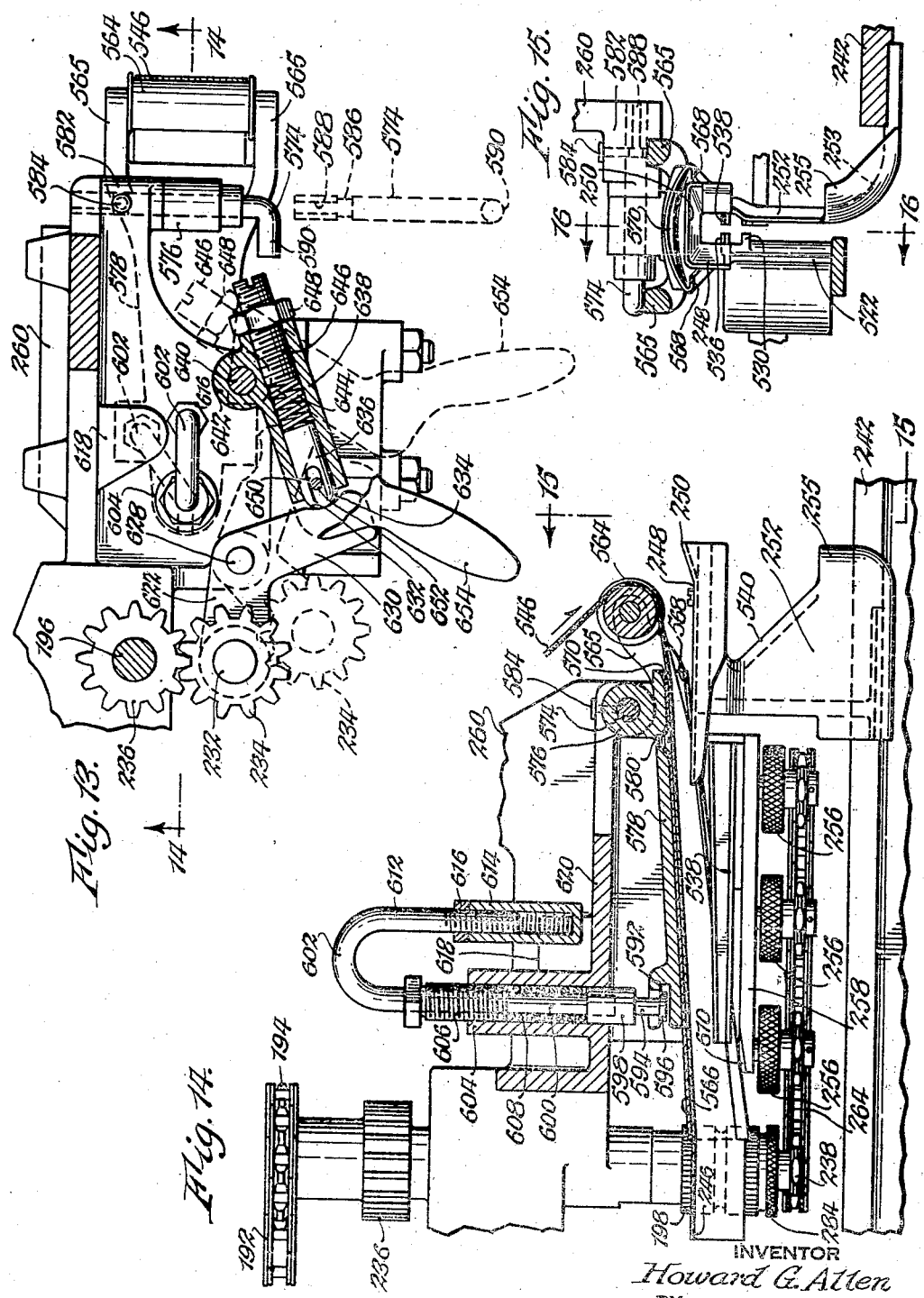

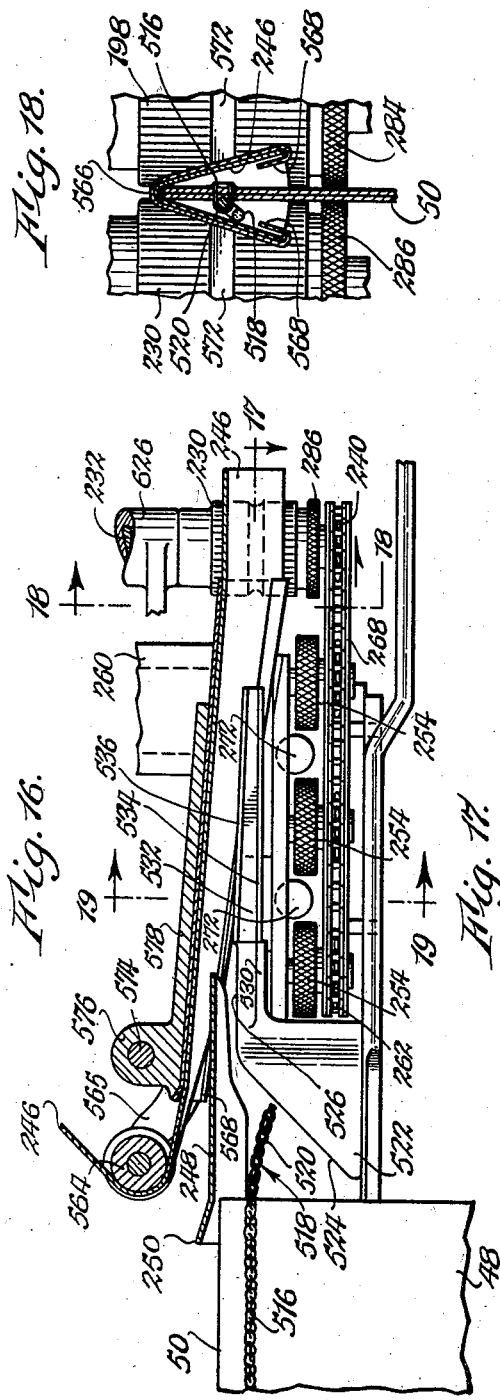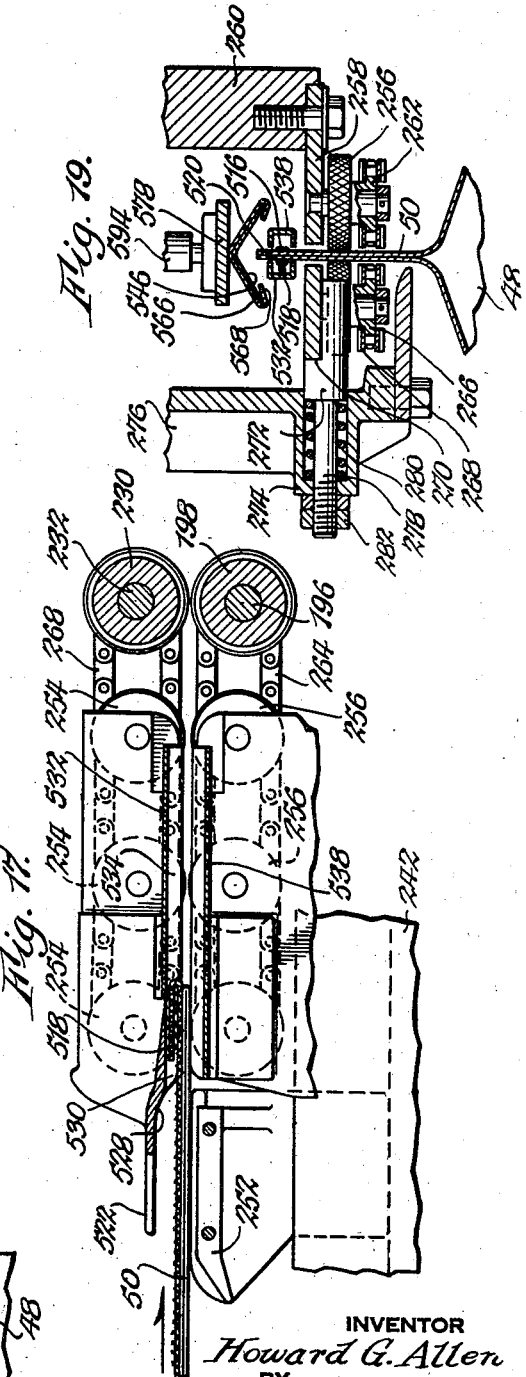

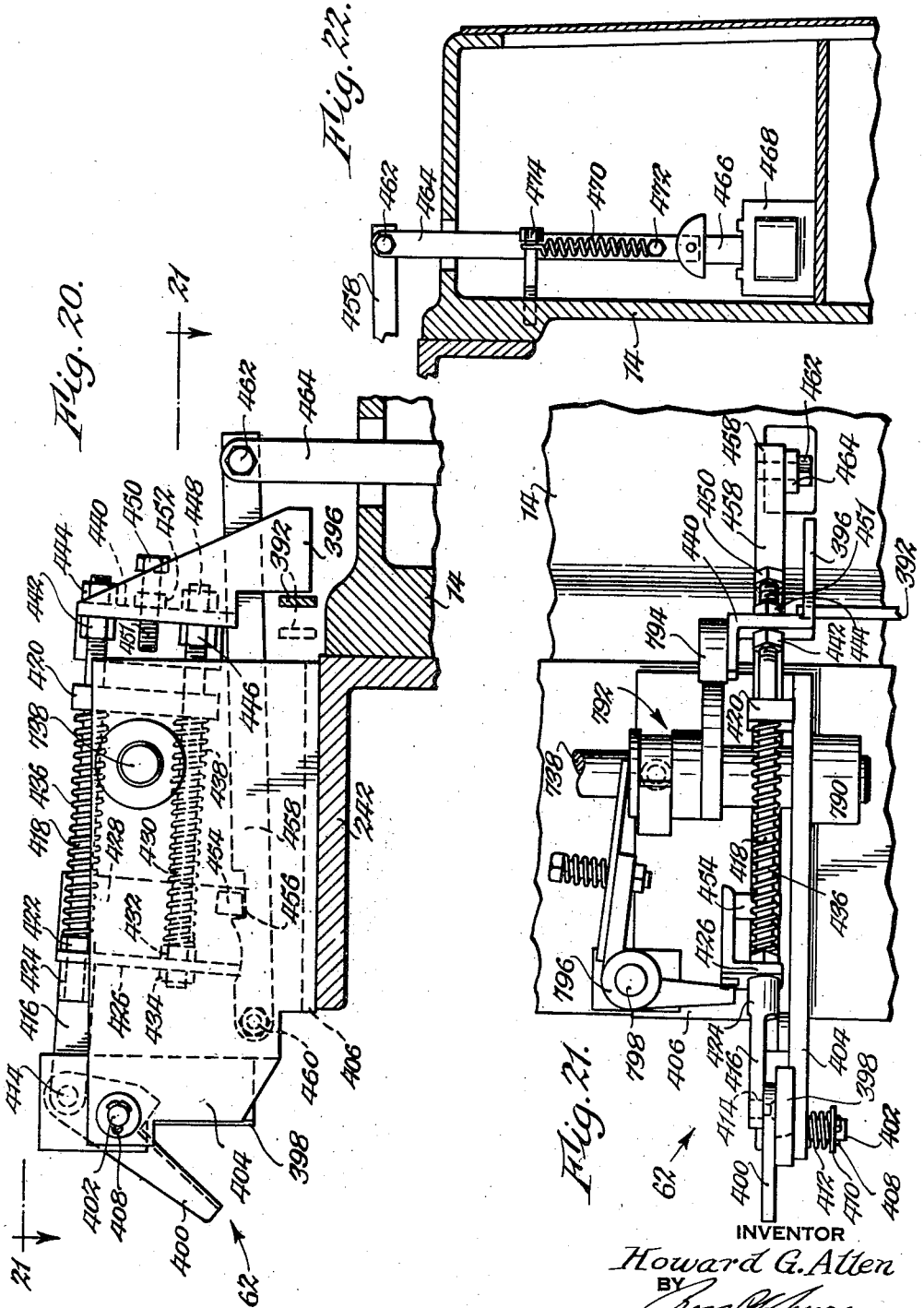

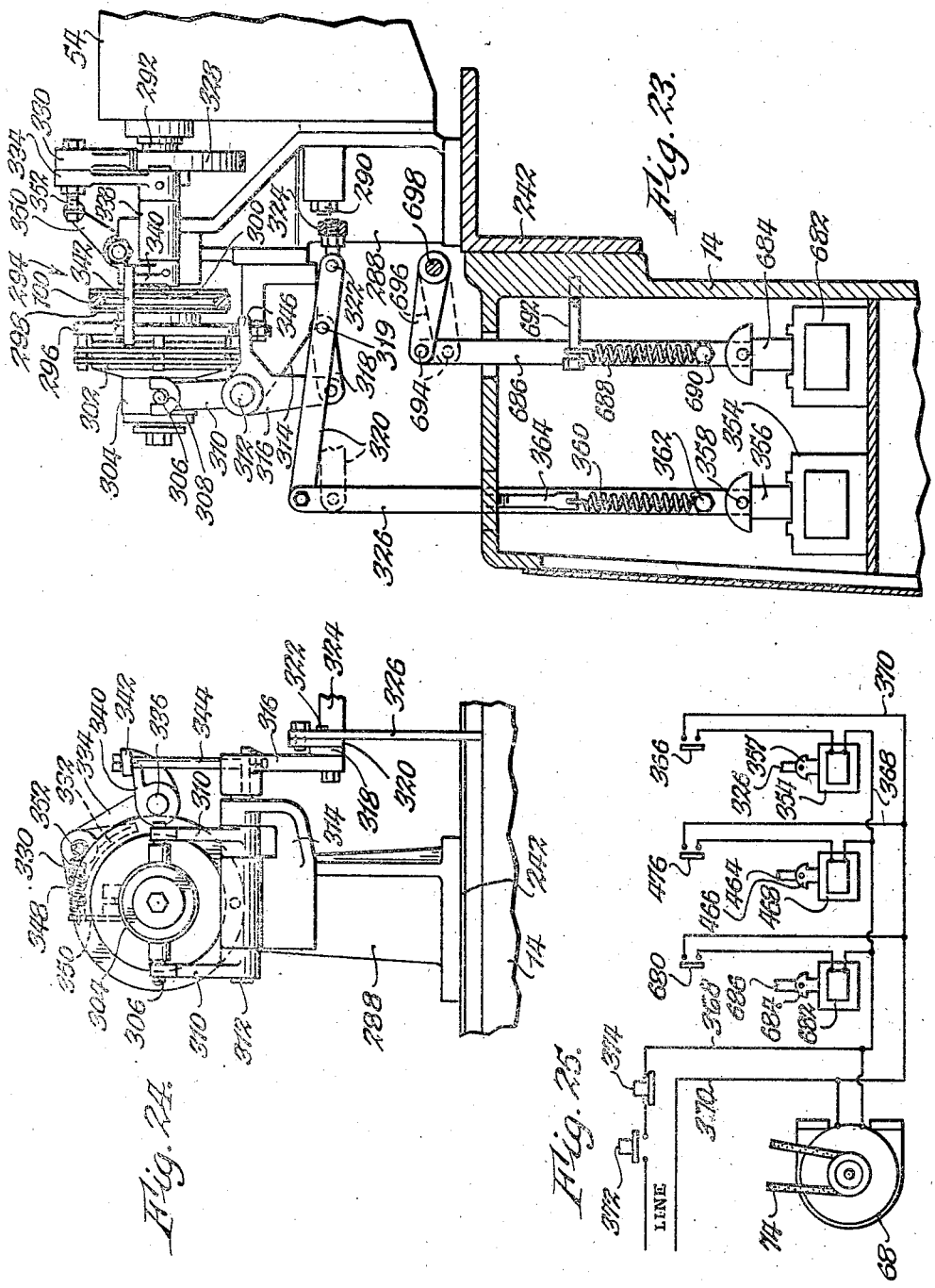

Aug. 18, 1942.  H. G. ALLEN  2,293,686
BAG CLOSING MACHINE
Filed Sept. 13, 1939  10 Sheets—Sheet 10
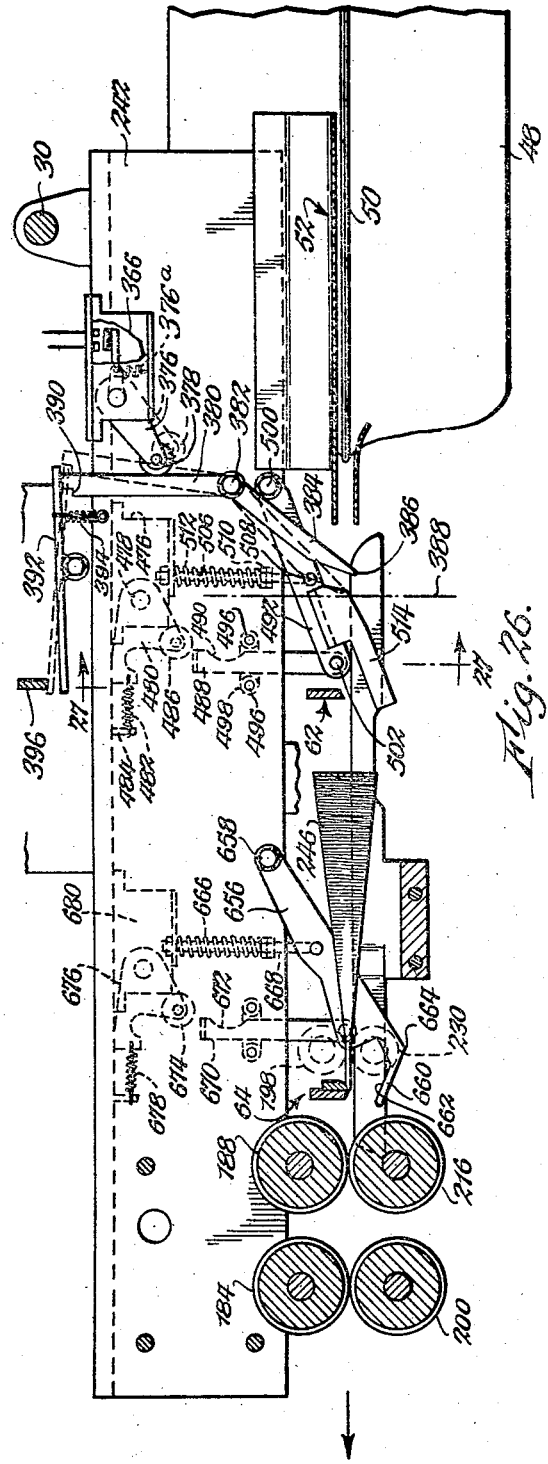
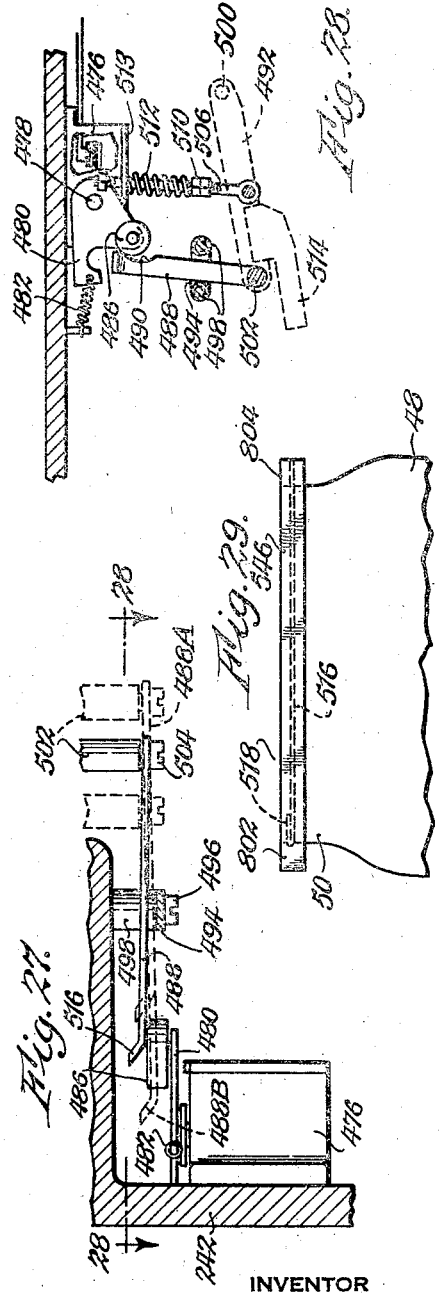
INVENTOR
Howard G. Allen
BY
ATTORNEY Patented Aug. 18, 1942

2,293,686

UNITED STATES PATENT OFFICE 2,293,686

BAG CLOSING MACHINE

Howard G. Allen, Niagara Falls, N. Y., assignor to Bagpak, Inc., New York, N. Y., a corporation of Delaware Application September 13, 1939, Serial No. 294,650

3 Claims. (Cl. 112—11)

The present invention relates to bag closing mechanism and more particularly to mechanism suitable to rapidly and effectively close and seal the open mouths of large heavy duty paper bags of the type capable of containing upwards of 100 pounds or more of a commodity.

It is an object of the present invention to provide a machine of the type described which is exceedingly compact and which may be constructed at a relatively low cost.

It is a further object of the present invention to provide a machine which will apply a line of stitching to the open mouth of a filled bag and which will securely apply an adhesive coated tape over the bag mouth and the line of stitching therein in order to form a strong, air-tight and sift-proof closure.

It is a further object of the present invention to provide a machine having a normally continuously running conveyor upon which a filled bag may be positioned and a normally inoperative sewing head which is under the control of bag sensing mechanism whereby the sewing head becomes operative only when a bag is in position to be operated upon by said sewing head.

It is a further object of the present invention to provide in a bag closing machine which includes a normally constantly running conveyor, a normally inoperative sewing head adapted to be operated in response to the passage of a bag upon the conveyor to close the mouth of the bag by a line of stitching, a device for applying sealing tape to the closed mouth and devices for severing the line of stitching and the length of tape applied to the bag, a main control device which may be operated to stop all elements of the machine which may be operating at any given time.

It is a further object of the invention to provide, in a machine of the type described, devices for facilitating cleaning and rethreading of the tape applying portion of such machine.

It is a further object of the present invention to provide means for disposing an excess length of thread chain into a position wherein it will be concealed by a sealing tape.

Other and further objects of the present invention will appear more fully upon consideration of the following detailed description of a preferred, but not necessarily the only form of the invention, taken in connection with the drawings accompanying and forming a part of the present specification.

In the drawings,

Fig. 1 is an elevational view showing the general organization of the machine;

Fig. 2 is a horizontal section taken along the line 2—2 in Fig. 1 and showing details of the conveyor elevating mechanism;

Fig. 3 is an end elevation of the machine shown in Fig. 1;

Fig. 4 is a detailed front elevation of the bag closing stations in the machines shown in Fig. 1;

Fig. 5 is a vertical section taken along the line 5—5 of Fig. 4 and showing details of the driving mechanism;

Fig. 6 is a horizontal section taken along the lines 6—6 of Fig. 4;

Fig. 7 is a vertical section taken along the line 7—7 of Fig. 4;

Figs. 8 and 9 are vertical sections taken along the line 8—8 of Fig. 4 illustrating two operative positions of the tape shearing mechanism;

Figs. 10 and 11 are detailed sections taken along the lines 10—10 and 11—11 respectively of Fig. 8;

Fig. 12 is a partial view similar to Fig. 11 and showing the parts in a different, operated position;

Fig. 13 is an irregular horizontal sectional view taken along the line 13—13 of Fig. 4 and showing details of the tape applying station of the machine;

Fig. 14 is a vertical sectional view taken along the line 14—14 of Fig. 13;

Fig. 15 is a vertical section taken along the line 15—15 of Fig. 14 showing the tape guiding mechanism and thread guiding mechanism in elevation;

Fig. 16 is a vertical section taken along the lines 16—16 of Fig. 15;

Fig. 17 is a horizontal sectional view taken along the line 17—17 of Fig. 16;

Figs. 18 and 19 are detailed sectional views taken along the lines 18—18 and 19—19 respectively of Fig. 16 illustrating the operation of the mechanism shown in Figs. 13 to 17 inclusive;

Fig. 20 is a vertical section taken along the line 20—20 of Fig. 4 illustrating the thread shear mechanism;

Fig. 21 is a horizontal section taken along the line 21—21 of Fig. 20;

Fig. 22 is a vertical section similar to Fig. 20 illustrating the actuating solenoid for the mechanism shown in Fig. 20;

Fig. 23 is a vertical elevation with parts in section illustrating the clutch and brake controls for the sewing head, the solenoid for actuating the clutch and brake and a solenoid for the operation of the tape shear mechanism shown in Fig. 8;

Fig. 24 is a rear elevation of the clutch and brake mechanism shown in Fig. 23;

Fig. 25 is a wiring diagram;

Fig. 26 is a horizontal section taken along the line 26—26 of Fig. 4 illustrating the various bag actuated control devices for the machine;

Fig. 27 is a vertical section taken along the line 27—27 of Fig. 26;

Fig. 28 is a horizontal section taken along the line 28—28 of Fig. 27; and

Fig. 29 is a front elevation of a filled bag having a completed closure thereon formed in the machine constituting the present invention.

Similar characters of reference indicate similar parts throughout the several views. Each of the sections have been taken in the direction indicated by the arrows accompanying the section lines.

General organization

Referring now to Fig. 1 wherein there is shown a machine embodying the present invention, a base plate 10, which may be mounted upon suitable casters 12, has rising therefrom a pedestal 14 which serves as a main support for the bag closing mechanism. The base plate 10 has also rising therefrom a pair of cylindrical columns 16 upon each of which is mounted a sleeve 18 adapted for vertical sliding movement upon the column. Each of the sleeves 18 is provided with a suitable locking collar which may be clamped by a bolt 20 to secure the sleeve in vertical position relative to the column 16. The sleeves 18 serve as supports for a conveyor frame 22 and vertical adjustment of the sleeves 18 relative to the columns 16 adapts the machine for operation upon filled bags of different heights.

The sleeves 18 are each provided with outward extensions 24 which have suitable openings therein for the reception of support rods 26 (see Fig. 3) which extend forwardly to support the conveyor frame 22. The outward extensions 24 are each provided with a vertical bore which may be threaded internally, or, as shown in Fig. 3, may have seated therein a nut 28 adapted to threadably engage a vertically extending threaded rod passing therethrough. In Fig. 1 the right hand threaded rod 30 extends upwardly and carries in a convenient position a hand wheel 32. The lower end of the threaded rod 30 may be mounted in a suitable thrust bearing 34 carried by the base plate 10. As shown in the detailed Fig. 2, the threaded rod 30 extends below the thrust bearing 34 and carries at its lower extremity a sprocket wheel 36 about which is conducted a sprocket chain 38 which meshes with a sprocket wheel 40 carried on the lower extremity of the left hand vertically extending threaded rod 42. The threaded rod 42 rests upon a suitable thrust bearing 44 carried by the base plate 10 and extends upwardly into threadable engagement with the extension 24 of the left hand sleeve 18.

The structure just described provides for convenient vertical adjustment of the conveyor frame 22 relative to the base plate 10. It will be understood that when it is desired to make a vertical adjustment of this frame, the lock bolts 20 on the sleeves 18 will be loosened and that the hand wheel 32 will be rotated in an appropriate direction to raise or lower the right hand sleeve 18. The sprocket and chain connections 36, 38 and 40 will cause the left hand threaded rod 42 to rotate with the rod 30 and, accordingly, both of the sleeves 18 may be vertically moved as desired. When proper adjusted position has been reached, the lock nuts 20 may be reset to avoid accidental displacement.

The conveyor frame 22 and the conveyor 46 thereon may be of any suitable type or design. The particular mechanism shown in the drawings will be described hereinafter. For the purposes of a general understanding of the machine, it may be here stated that the conveyor 46 should preferably be continuously driven toward the left as viewed in Fig. 1 whenever the machine is in actual operation. It is also preferred to provide means for stopping the conveyor simultaneously with the other elements of the machine at any desired time. The mechanism for driving the conveyor and stopping the same when so desired will be explained in detail hereinafter.

In Fig. 1, a filled bag 48 is shown in position upon the conveyor 46. It will be understood that the conveyor frame 22 will have been adjusted to such a vertical position as to position the open mouth 50 of the bag 48 in proper alignment with the closure forming elements of the machine. In the operation of the machine the bag 48 is carried to the left as viewed in Fig. 1 and the open mouth theref is conducted into a generally U-shaped guiding channel 52 which serves to guide the mouth 50 into proper alignment with a sewing head 54. As the bag is conducted to the sewing head, the leading edge of the bag mouth engages a control lever which is moved thereby to start the sewing head. As the bag moves through the sewing head 54, the mouth 50 is closed by a line of stitching. The stitching applied by the sewing head 54 may be of any type found suitable but it is preferred to apply a reinforcing cord and to form the stitches around the reinforcing cord and through the bag mouth as shown in United States Letters Patent No. 1,913,825 granted June 13, 1933. From the sewing head 54 the bag is conducted into a tape applying station indicated generally at 56 at which station a tape of crinkled kraft or other suitable paper or textile material is folded over and adhered to the sides of the bag mouth whereby to seal the open end of the bag and to seal the holes formed in the bag during the stitching operation. The bag mouth and the tape bent thereover are drawn through this station by suitable tape feeding rollers indicated generally at 58 which are so spaced from one another as to grip the combined thickness of a bag mouth and folded tape but to be incapable of gripping the tape alone. From the tape feeding rollers 58 the bag mouth is conducted through a series of squeezing rolls indicated generally at 60 which serve to apply sufficient pressure to the tape and bag mouth to permanently secure the tape in sealing position. When the trailing end of the bag mouth leaves the sewing head a control device is moved to stop the sewing head and to reset the starting control. A severing device, indicated generally at 62, is provided to clip the thread chain, comprising stitching and reinforcing cord, extending behind the bag mouth. The operation of this severing device may be initiated substantially simultaneous with stopping of the sewing head and to this end may be controlled by the control device provided for stopping of the sewing head. The bag then continues through the tape applying and squeezing stations as as aforesaid and as the trailing end of the mouth 50 passes a suitably located control device an additional severing device, indicated generally at 64, is operated to clip the tape at a suitable distance from the trailing end of the bag mouth. After the bag passes completely through the squeeze rolls 60 the closure is complete and the bag may be removed from the conveyor. It is a particular feature of the present invention that the starting and stopping of the sewing head and the operation of the thread chain severing device and of the tape severing device are all under control of the leading or trailing ends of the bag mouth. Accordingly, each of these mechanisms operate only when needed and operate in perfect timed relationship with the passage of the bag through the various stations. A machine controlled in the manner herein disclosed is of particular value in forming closures upon a series of bags which may be placed upon the conveyor 46 in an irregular manner.

The machine is preferably equipped with a readily accessible foot actuated means for temporarily stopping all of the elements of the machine which are in operation at any given moment. The stopping means herein disclosed is so designed that the machine may be stopped at will irrespective of the position of the bag therein and may be restarted to complete the closure without the necessity for readjustment or other manipulation of the bag. A preferred form of stopping means is disclosed herein comprising a clutch interposed between the driving motor and the various devices driven thereby. This clutch is controlled by a foot treadle 66 which is adapted when depressed to disengage the clutch against the force of springs tending to maintain the clutch in engaged position. The machine may thus be temporarily stopped by depression of the foot treadle 66 and may be restarted by the removal of pressure therefrom.

Driving mechanism

The driving mechanism comprises a motor 68 suitably mounted upon brackets 70 rising from the base plate 10. The motor 68 is provided with a pulley 72 about which is conducted a V-belt 74 which serves to drive a pulley 76 freely rotatable upon a shaft 78 (see Fig. 5) which extends into a speed reducer 80 containing suitable gearing for driving a shaft 82 at a suitably reduced speed. The gearing within the speed reducer 80 has not been shown as it is obvious that any desired type of speed reducing mechanism may be used. The slow speed shaft 82 is utilized to drive, through mechanism to be later described, the conveyor 46, the tape feeding rollers 58, squeeze rolls 60 and the energy storing mechanisms for the severing devices.

A main clutch 84 is provided for optionally connecting the constantly rotating pulley 76 to the high speed shaft 78. The clutch 84 comprises a set of relatively movable driving rings 86 mounted for sliding movement parallel to the axis of shaft 78 upon a plurality of pins 88 secured to the driving pulley 76. The driving rings 86 are therefore mounted for rotation with the pulley 76 and constitute the driving side of the clutch. The driven side of the clutch comprises a plurality of relatively movable rings 90 in alternate relation with the driving rings 86 and mounted for sliding movement upon a plurality of pins, not shown, secured to a flange 92 keyed to the shaft 78. A retaining ring 94 and a pulley 96 are keyed to the shaft 78. The pulley 96 and driven rings 90 are thus mounted for rotation with the shaft 78. A clutch collar 98 is mounted for axial sliding movement upon the shaft 78 and serves, when shifted to the left as viewed in Fig. 5, to frictionally interengage the driving and driven rings 86 and 90 respectively. Suitable springs, not shown, serve to normally maintain the clutch collar in its leftward position illustrated in Fig. 5. Suitable control mechanism is provided to shift the clutch collar 98 to the right as viewed in Fig. 5 to disengage the clutch. The structure thus described provides for optional driving connection between the motor driven pulley 76 and the gear box 80 and pulley 96. The pulley 96 serves through a V belt 100 to drive the sewing head 54.

In Fig. 3 there is shown the control mechanism for operation of the clutch 84. The clutch collar 98 is keyed against rotation upon a suitable non-rotatable collar surrounding the shaft 78, not shown, and is provided with radially extending pins 102 which are received in slots 104 formed in the ends of a yoke 106 pivoted at 108 to a suitable bracket on the main frame of the machine. A lever 110 is fixed to the yoke 106 and forms therewith a bell crank rotatable about the pivot 108. A link 112 is pivoted as at 114 to the end of lever 110 and extends downwardly through the base plate 10 where its lower end is pivoted at 116 to a rock arm 118 fixed for rotation with a rock shaft 120 extending transversely of the base plate 10. The rock shaft 120 has also fixed thereto for rotation therewith a pair of arms 122 which serve as supports for the treadle 66. Downward pressure upon the foot treadle 66 will rock the frame 122, 120, 118 to move the link 112 upwardly and thereby to rock the bell crank 110, 106 in a clockwise direction as viewed in Fig. 3. This will result in a movement of the clutch collar 98 to the left as viewed in said figure and will cause separation of the driving and driven clutch rings 86 and 90 respectively whereby to disengage the driving motor from the speed reducer 80 and sewing head pulley 96. When pressure is released from the foot treadle 66 the clutch is permitted to reengage whereupon the various elements of the machine are connected in driving relation with the motor 68.

The mechanism for driving the conveyor 46 comprises a gear 124 keyed, as shown in Fig. 5, to the low speed shaft 82 and meshing with a gear 126 mounted for rotation upon a suitable stub shaft 128 carried by a housing 130. The housing 130 is pivotally supported by the low speed shaft 82 and may extend upwardly and over the gear 124. Fixed for rotation with the gear 126 is a sprocket wheel 132 about which is conducted a sprocket chain 134. As shown in Figs. 1 and 3 the chain 134 extends within the housing 130 about a sprocket wheel 136 mounted for rotation upon a stub shaft 138 carried by the outer extremity of the housing 130. The stub shaft 138 extends forwardly from the housing 130 and pivotally supports a housing 140 within which is located a sprocket wheel 142 fixed upon the shaft 138. A sprocket chain 144 extends around the sprocket wheel 142 and within the housing 140 to a sprocket wheel 146 keyed to a drive shaft 148 extending through the conveyor frame 22. The drive shaft 148 has keyed thereon a pair of conveyor driving sprockets 150 which serve to drive the conveyor 46. At its opposite end the conveyor 46 may be conducted around suitable sprockets carried by an idler shaft 152 mounted in adjustable bearing blocks 154 horizontally slidable within slots 156 in the conveyor frame 22. Suitable mechanism indicated at 158 may be provided for securing the adjustable idler shaft 152 in proper adjusted position.

The mechanism just described provides for a constant driving relationship between the low speed shaft 82 and the conveyor 46 irrespective of the vertical position of the conveyor upon the frame of the machine. It will be seen that vertical movement of the conveyor frame 22 will result in rocking of the housings 130 and 140 together with the sprocket and chain devices therein about the shafts 82, 138, and 148 and that no disturbance of the driving relationship will occur.

Referring again to Fig. 5, it will be seen that the low speed shaft is also availed of to drive the tape feeding and squeezing stations of the machine. To this end the shaft 82 has fixed thereto a sprocket 160 which drives, through a sprocket chain 162 and sprocket wheel 164, a shaft 166 to which the sprocket wheel 164 is keyed. The shaft 166 carries at its opposite end a bevelled gear 168 which meshes with a similar bevelled gear 170 keyed to a vertically extending shaft 172. At its upper end the shaft 172 carries a sprocket wheel 174 which drives a sprocket chain 176. The chain 176 passes around a sprocket 178 shown in Figs. 5 and 4 and around an additional sprocket wheel 180 shown in Fig. 4. The chain 176 describes a generally triangular path around the three sprocket wheels with which it meshes and suitable chain tightener mechanism may be provided if so desired. The sprocket 178 is fixed upon the upper end of a vertically extending shaft 182 mounted for rotation within suitable bearings formed in a bracket 183. At its lower end the shaft 182 carries one of the rear squeeze rolls 184 (see Fig. 5). The sprocket 180 is similarly fixed upon the upper end of a shaft 186 (see Fig. 6) which carries at its lower end another rear squeeze roll 188. The driving mechanism just described provides for the transmission of rotation from the low speed shaft 82 to the rear squeeze rolls 184 and 188.

The shaft 186 is extended upwardly beyond the sprocket 180 and carries a sprocket 190 about which is conducted a sprocket chain 192 which serves to drive a sprocket 194 mounted upon the upper end of a vertically extending shaft 196 (see Fig. 7) at whose lower end is mounted the rear tape feeding roller 198. The ratio between the diameters of the squeeze rolls and tape feeding rollers is taken in consideration in the design of the sprockets 190 and 194 in order that the peripheral speed of the rolls 184, 188, and 198 may be equal.

Each of the rear squeeze rolls 184 and 188 has resiliently pressed thereagainst a front squeeze roll. As shown in Fig. 6 a front squeeze roll 200 is mounted on the lower end of a vertically extending shaft 202 mounted for rotation within a bracket 204 pivoted at 206 to the bracket 183. The bracket 204 is provided with a perforated ear 208 in which is loosely received a bolt 210 extending through the bracket 183. An expansive spring 212 is confined between the ear 208 and a suitable nut 214 threadably received on the outer end of the bolt 210. The nut 214 may be adjusted to cause the spring 212 to exert a desired amount of resilient pressure upon the ear 208 and thus to press the squeeze roll 200 against the rear squeeze roll 184.

A front squeeze roll 216 is mounted upon a vertical drive shaft 217 and a spring pressed bracket 218 similar to the bracket 204. A spring 220 mounted in the same manner as the spring 212 serves to press the front squeeze roll 216 resiliently against the rear squeeze roll 188.

The drive shafts 202 and 217 are driven by gears 222 mounted upon the drive shafts 182 and 186 of the rear squeeze rolls. To this end, the shafts 202 and 217 are provided respectively with gears 226 and 228 (see Fig. 4) which mesh with the gears 222. The teeth of these intermeshing gears are made sufficiently deep to maintain driving relationship during normal operation of the squeeze rolls. The resilient mounting of the front squeeze rolls above described is provided to permit the rolls to exert pressure upon the completed bag closure and it is apparent that as the bag mouths are conducted between the rolls they will be separated against the force of the springs 212, 220. As above described, the gears maintain driving relationship during such operation.

As shown in Fig. 7 a front tape feeding roller 230 is provided. The front roller is mounted upon a movable frame which will be hereinafter described. The roller 230 is mounted upon a vertical drive shaft 232 which carries at its upper end a gear 234 adapted to mesh with a gear 236 upon the vertical drive shaft 196 for the rear tape feeding roller 198. At the lower end of each of the shafts 196 and 232 there is mounted respectively a sprocket wheel 238 and 240. As shown in Figs. 16 and 17 these sprockets serve to drive a series of bag feeding rollers which operate to feed the bags through the tape forming station. These rollers will be described in detail hereinafter.

*Bag guiding and feeding mechanism*

Referring now to Fig. 4 there is shown an angle 242 mounted upon the upper end of the pedestal 14. The angle 242 serves as the main support or table upon which most of the mechanism heretofore described is supported. The intake bag guide 52 is mounted upon the angle 242 and comprises a generally vertical rear wall 244 against which the bag mouth may be manually pressed. Adjacent the sewing head 54 the guide 52 has formed thereon a forwardly projecting down-turned lip 246 which forms, with the rear wall 244, a U-shaped channel through which the bag mouth may be conducted and accurately guided into proper position relative to the sewing head. It will be understood that the conveyor 46 will be adjusted to proper vertical position with respect to the particular size of the bag wherein the top of the bag mouth 50 will be lightly pressed upwardly into contact with the inner surface of the channel thus formed. The horizontal level of the bag mouth 50 is thus established by the intake guide and the closure forming devices of the machine are positioned to form a proper closure upon a bag mouth maintained at the level thus established.

The conveyor 46 progresses the bag to the left as viewed in Fig. 4, through the intake guide 52 and through the sewing head 54. The sewing head 54 may be of any suitable type. The particular head chosen for illustration is shown in full detail in Patent No. 2,043,149 granted June 2, 1936, and the particular design thereof forms no part of the present invention. The stitch-forming mechanism is indicated at 55 in Fig. 4 and it will be understood that the mechanism 55 is operative to form suitable threads 57 (Fig. 1) into a chain of stitching. As the leading edge of the bag mouth 50 leaves the sewing head it enters an intermediate guide 248 which serves to maintain the bag in proper horizontal and vertical alignment for its travel through the tape applying station 56. The intermediate guide 248 is preferably formed as an inverted U-shaped channel and may be flared outwardly at the intake end as indicated at 250 The position of the guide 248 is shown in Fig. 4 and enlarged detail views are shown in Figs. 14 and 15. In Fig. 15 the intermediate guide 248 is shown in elevation from its intake end. As shown in Figs. 14 and 15 a suitable bracket 252 rising upwardly from the angle 242 serves to support the guide 248. Preferably the bracket 252 is curved as shown at 253 and is provided with a guide flange 255 outwardly flared to generally conform to the rounded shoulder of a filled bag.

As the leading end of the bag mouth 50 leaves the intermediate guide 248 it is conducted to a series of rear feeding rollers 256 and front feeding rollers 254 (see Figs. 14 to 19 inclusive). The rear feeding rollers 256 are mounted upon stub shafts rotatably carried by a plate 258 which is supported by a bracket 260 fixed to the angle 242. Each of the rear rollers 256 is provided with a driving sprocket 262 of smaller diameter than that of the roller and a sprocket chain 264 extends in driving relation around all of such sprockets and into engagement with the sprocket 238 upon the lower end of the rear tape feeding roller 198.

The front bag feeding rollers 254 are each provided with driving sprockets 266 similar to the sprockets 262 and a sprocket chain 268 extends in driving relationship with said sprockets and with the sprocket 240 on the front tape feed roll shaft 232. The rollers 254 are mounted on vertical stub shafts rotatably carried by a plate 270 (see Fig. 19) carried by a pair of spring plungers 272 received within suitable sockets 274 formed in a bracket 276. The plungers 272 are formed with reduced portions 278 terminating in a threaded portion projecting beyond the bracket 276. Expansive springs 280 are confined within the sockets 274 and serve to urge the front feed rollers 254 rearwardly of the machine and into yieldable contact with the rear feeding rollers 256. Suitable lock nuts 282 may be threaded upon the extension 278 to retain the springs 280 in position upon the bracket 276.

The operation of the feeding rollers 254 and 256 upon the mouth of the bag is illustrated in Fig. 19. As shown in said figure the feeding rollers are pressed into engagement with the bag mouth 50 at a level considerably below the upper edge of the bag mouth. The actual distance from the upper edge of the bag mouth to the level of the feeding rollers is at least sufficient to permit the closure to be completely formed above the feeding rollers. The feeding rollers are preferably knurled on their engaging surfaces in order to increase their effectiveness. As shown in Figs. 14 and 16 the tape feeding rollers 198 and 230 are provided with knurled roller portions which engage the lower portion of the bag mouth and serve as initial feeding rollers whose operation precedes that of the rollers 254 and 256. In Fig. 14 the knurled portion 284 upon the rear tape feeding roll 198 is shown while in Fig. 16 the knurled portion 286 formed upon the front tape feeding roll 230 is shown. The cooperation of the knurled portions 284 and 286 with the bag mouth 50 is illustrated in Fig. 18.

*The sewing head*

As above described, the sewing head 54 is driven by the V-belt 100 (see Fig. 4) which is selectively connected to the driving motor 68 by actuation of the main clutch 84. According to the present invention, the sewing head may be started and stopped not only by actuation of the main clutch 84 but also by actuation of a separate clutch provided exclusively for the control of the sewing head. This separate clutch includes a brake which operates upon the disengagement of the clutch to bring the sewing head to a rapid stop as will be more fully described hereinafter. The sewing head forms a chain of stitches about a reinforcing cord and such chain of stitches is continuously formed during operation of the sewing head whether or not a bag is positioned within the machine. In the present use of the sewing head the bag mouth is stitched and the chain of stitches continues beyond the rear end of the bag mouth until the sewing head is stopped. This rearwardly extending chain of stitches is severed at a predetermined distance behind the bag mouth by mechanisms which will be later described and it is accordingly desirable that the sewing head be stopped as rapidly as possible in order that the chain of stitching extending from the needle to the point of severance be as short as possible. Accordingly, when the sewing head is started and stopped incidental to the closing of a bag mouth, the separate clutch and brake mechanism is used. However, when the machine as a whole is stopped by disengagement of the main clutch the momentum of the bag upon the conveyor and the moving parts of the tape applying and squeezing stations will result in a certain amount of overrun or coasting. If the main clutch is disengaged while a bag mouth is in stitching position within the sewing head, it is desirable that the sewing head be allowed to stop simultaneously with the other mechanisms whereby stitches will continue to be formed through the period of overrun.

Referring now to Figs. 23 and 24, a sewing head supporting bracket 288 is shown secured to the angle 242. The sewing head 54 is secured to the bracket 288 in any desired manner, as for example, by bolts 290 and suitable bosses (not shown). A drive shaft 292 extends rearwardly from the upper portion of the sewing head 54 and it will be understood that rotation of the drive shaft 292 will result in operation of the stitch-forming mechanism 55 of the sewing head. The shaft 292 is connected by suitable coupling means (not shown) to the clutch and brake mechanism indicated generally at 294. The bracket 288 is extended upwardly and provided with suitable bearing supports for various parts of the clutch and brake mechanism. The clutch is substantially identical with the main clutch 84 and comprises a set of driving rings 296 secured for rotation with a pulley 298 which is driven by the V belt 100. The pulley 298 and driving rings 296 are freely rotatable upon a shaft 300 which is coupled as above stated with the drive shaft 292 of the sewing head. The driven side of the clutch comprises a set of driven rings 302 keyed to the shaft 300 and adapted to be laterally moved into frictional contact with the driving rings of the clutch by axial movement of a clutch collar 304. The clutch collar 304 has a pair of radially extending studs 306 which are received in the bifurcated ends 308 of a yoke 310 fixed to a shaft 312 rotatable on a rearward extension 314 of the bracket 288. As shown in Fig. 24, the shaft 312 extends beyond the support 314 and has fixed thereon a downwardly extending lever 316 which is pivotally connected through a link 318 as at 319 to a lever 320 fulcrumed at 322 to an ear 324 formed on a stationary bracket. At its other end, the lever 320 is pivotally connected to a vertically movable plunger 326 extending into the box section of the pedestal 14. The plunger 326 is moved vertically between the full line position of Fig. 23 and the dotted line position of said figure by means which will be hereinafter described. Vertical movement of the plunger 326 in a downward direction into the dotted line position will result in movement of the link 318, through toggle action, to the left as viewed in Fig. 23 to rotate the lever 316 and rock shaft 312 together with the yoke 310 in a clockwise direction to move the clutch collar 304 to the right, thus engaging the clutch to transmit rotary motion from the pulley 298 to the sewing head drive shaft 292.

The shaft 300 has fixed thereon adjacent its end which is coupled to the drive shaft 292 a brake drum 328. A brake shoe 330 having suitable friction surfacing 332 is freely pivoted upon the upper end of a lever 334 fixed to a rock shaft 336 pivoted in a suitable bearing 338 upon the bracket 288. At its opposite end the rock shaft 336 has fixed thereto a lever 340 formed with a perforated extension 342. An elongated bolt 344 extends through the perforation of the extension 342 and through a perforated ear 346 formed upon the lever 316. The brake shoe 330 is normally urged toward the brake drum 328 by a contractile spring 348 extending between a suitable anchorage 350 and the pivot 352 upon which the brake shoe is supported. When the lever 316 is rotated in a clockwise direction to engage the clutch elements, the ear 346 pulls downwardly upon the bolt 344 and rocks the rock shaft 336 in a clockwire direction as viewed in Fig. 24. The brake shoe supporting lever 334 rocks in a clockwise direction with the rock shaft and raises the brake shoe against the force of spring 348 away from the brake drum 328. It will thus be seen that movement of the clutch into a position wherein the sewing head is to be driven will result in release of the brake. When the plunger 326 is moved upwardly to its full line position shown in Fig. 23, the clutch will be disengaged and the spring 348 will be permitted to set the brake whereby to stop the sewing head immediately upon disengagement of the clutch.

*Sewing head control*

Vertical movement of the plunger 326 to engage the sewing head clutch is produced by a solenoid 354 (Fig. 23) having an armature 356 pivoted at 358 to the lower end of the plunger 326. Energization of the solenoid 354 will result in movement of the armature 356 downwardly and through the pivotal connection 358 the plunger 326 will be drawn downwardly to engage the clutch. A contractile spring 360 is stretched between an anchorage 362 on the plunger 326 and an anchorage 364 secured to the pedestal 14. The contractile force of the spring 360 tends to raise the plunger 326 to the full line position of Fig. 23 wherein the clutch is disengaged and the brake is set. When the solenoid 354 is deenergized the spring 360 will return the clutch to disengaged position and will set the brake as above described.

In the wiring diagram shown in Fig. 25 the solenoid 354 is connected in series with a switch 366 adapted when closed to connect the solenoid across suitable electric power lines 368 and 370. A main switch 372 may be interposed in the line 368, for example, and may be availed of to start the machine. A stop switch 374 may also be connected in series with the line 368, for example, and may be availed of to stop the machine. It will be understood that the switches 372 and 374 control all of the devices of the machine and are thus not limited to the control of the solenoid 354. In the following description it will be assumed that the switches 372 and 374 are in circuit closing position.

According to the present invention the switch 366 is adapted to be controlled by the leading and trailing ends of the bag mouth 50 and the control mechanism is so designed that the leading end of the bag mouth closes the switch 366 to energize the solenoid 354 and thus to initiate operation of the sewing head. Additional control mechanism is provided whereby the trailing end of the bag mouth 50 causes opening of the switch 366 and the consequent stopping of the sewing head.

Referring now to Fig. 26 the switch 366 is shown and includes a control lever 376 which serves to move the contact elements of the switch into and out of the circuit closing position. The full line position of the lever 376 in Fig. 26 corresponds to the circuit opening position of the switch contacts while the dotted line position of this lever corresponds to the circuit closing position of the switch contacts. It will be understood that the switch 366 is provided with an internal spring 376a which serves to constantly urge the contacts into open position and thus to urge the lever 376 to its full line position. At its free end the lever 376 carries an anti-friction roll 378 which is adapted to bear against one arm 380 of a two-armed trip lever pivoted upon a post 382 supported upon the angle 242. The other arm 384 of the trip lever extends angularly across the path of the bag mouth through the machine. When the leading end of the bag mouth 50 progresses into engagement with the arm 384 it will rock the arm about the pivot 382. The length of the arm 384 is so chosen that the tip 386 thereof will ride over the leading end and will thereafter bear against the rear face of the bag mouth 50. The position thus assumed by the arm 384 is illustrated in dotted lines in Fig. 26. As the arm 384 is moved to its dotted line position the arm 380 is also moved to its dotted line position wherein the lever 376 is rocked to switch closing position. The arm 384 is so positioned in the path of the bag mouth 50 that it will serve to close the switch 366 just prior to the arrival of the leading end of the bag mouth at the center line of the stitch-forming mechanism 55 of the sewing head 54. The center line is illustrated in Fig. 26 as a dot-dash line 388 and it will be observed that the tip 386 of the arm 384 is moved into a position almost coinciding with said center line 388 by the leading end of the bag mouth. The exact position of the arm 384 is of course a matter of individual design. It is preferred to delay the starting of the sewing head to the utmost extent whereby the thread chain extending in front of the bag mouth will be no longer than is absolutely necessary.

Since the tip 386 of the control arm 384 lies ahead of the needle of the sewing head, it is apparent that it would be impractical to permit the return of the arm 384 to its full line position as a result of the passage of the trailing end of the bag mouth to disconnect the switch 366 for stopping the sewing head. The operation of the sewing head must continue until such time as the thread chain may be severed. Immediately upon severance of the thread chain from the bag mouth the sewing head may be stopped. Accordingly, the arm 380 of the control lever is extended rearwardly and has formed thereon a latch seat 390. A latch 392 is pivoted on a suitable support and is provided with a contractile spring 394 which tends to rock the latch in a clockwise direction as viewed in Fig. 26. When the control lever is moved by the bag mouth into its dotted line position, the latch 392 under the influence of its spring 394 will drop into the seat 390 to hold the control lever in switch closing position. This position will be maintained until such time as it is desired to stop the sewing head. To this end a latch trip 396 is provided and in a manner to be hereinafter explained the latch trip 396 is moved to release the latch 392 during the operation of the thread chain severing device. The latch trip 396 serves to move the latch 392 to its full line position in Fig. 26 wherein the control lever 380, 384 is free to swing to its full line position wherein the sewing head clutch is disengaged and the brake is set.

Thread chain severing device

The thread chain severing device indicated generally at 62 in Figs. 1 and 4 is shown in detail in Figs. 20 and 21 and the control mechanism therefor is shown in Fig. 22. This severing device is similar in its essential design to the tape severing device 64 which is shown in much greater detail in Figs. 8 to 12 inclusive. Certain structural details of the thread chain severing device will more clearly be understood after a reading of the description of the tape severing device which appears hereinafter. Referring now to Fig. 20, the thread severing device comprises a fixed blade 398 and a movable blade 400 pivotally supported by a stud 402 rotatable within a suitable opening in a vertical support plate 404 which forms one leg of an angular bracket whose horizontal leg is indicated at 406. The bracket 406 is secured in any suitable manner to the angle 242. The stud 402 is provided at its free end with a pin 408 which serves to retain a washer 410 between which and the support plate 404 is confined an expansive spring 412. The spring 412 serves to yieldably press the movable blade 400 into contact with the stationary blade 398 in order that said blades may cooperate as a shear.

In a position above the pivot 402 the movable blade 400 is pivotally connected as at 414 with the forward end of a link 416 secured to a plunger 418 which is guided for sliding motion within a lug 420 secured to the vertical support plate 404. The plunger 418 is provided at its forward end with a threaded portion upon which is threaded a nut 422 and the internally threaded sleeve 424 forming a part of the link 416. The nut 422 and sleeve 424 confine between them a web 426 of an angular bridge member whose other web 428 extends rearwardly and generally parallel to the plunger 418. Beneath the plunger 418 there is located a similar plunger 430 having a threaded portion at its forward end which receives a pair of nuts 432 and 434 which serve to secure the plunger to the web 426. The plunger 430 is guided for sliding movement in the lug 420. An expansive spring 436 is positioned on the plunger 418 and is confined between the nut 422 and lug 420 to urge the plunger 418 to the left as viewed in Fig. 20. A similar expansive spring 438 is positioned upon the plunger 430 and its expansive force is added to that of the spring 436 through the medium of the web 426. The combined force of the springs 436 and 438 serves to rock the movable blade 400 in a counter-clockwise direction as viewed in Fig. 20 whereby to bring said blade into cutting relationship with the fixed blade 398.

At their rear ends the plungers 418 and 430 are joined by a vertically extending web of a bridge member 440 which is perforated for the passage of the plungers therethrough and which is confined between a pair of nuts 442 and 444 upon the plunger 418 and a pair of nuts 446 and 448 upon the plunger 430. Thus, the plungers 418 and 430 and the bridge members 426 and 440 form a rigid rectangular frame which is urged by the springs 436 and 438 to the left as above described. A threaded opening is provided in the web 440 intermediate the plungers 418 and 430. This opening receives a screw 450 whose forward end 451 is aligned for contact with the lug 420. The screw 450 may be adjusted to serve as a limit stop to determine the extent of leftward movement of the rectangular frame. A suitable lock nut 452 may be threaded upon the screw 450 to lock the same in adjusted position.

In Fig. 20 the severing device is illustrated in an open or cocked position. In this position the springs 436 and 438 are compressed and the plungers 418 and 430 have been moved rearwardly by mechanism to be hereinafter described in connection with the tape severing device. The severing mechanism is latched in this cocked position by the cooperation of a lug 454 formed upon the web 428 and a latch seat 456 formed in a lever 458 pivoted at 460 upon the vertical support plate 404. The lever 458 extends rearwardly and is pivoted at 462 to a vertical plunger 464. Downward movement of the plunger 464 will serve to withdraw the latch seat 456 from the lug 454 whereupon the plungers 418 and 430 will be projected by the springs 436 and 438 to the left as viewed in Fig. 20. The link 416 will thereupon serve to rock the movable blade 400 about its pivot 402 to perform the shearing operation.

The latch trip 396, which has been discussed in connection with Fig. 26, is shown in Fig. 20 as a downward extension of the bridge member 440. In Fig. 20 the latch 392 is shown in a full line position which corresponds to the dotted position of this latch in Fig. 26. In Fig. 20 the latch 392 is disposed in the path of the latch trip 396 and upon forward movement of the shear actuating frame the trip 396 will move the latch 392 forwardly into its dotted line position. As explained above in connection with Fig. 26, forward movement of the latch 392 serves to release the control arm 380 and to result in stopping of the sewing head. The apparatus just described therefore provides for operation of the thread chain severing device to sever the chain of stitches extending behind the trailing end of the bag mouth 50 and simultaneously to stop the sewing head.

Control of thread severing device

As above stated the thread severing device is released for operation by vertical movement of the plunger 464 extending into the box section of the pedestal 14. As shown in Fig. 22, the plunger 464 has pivoted to its lower end an armature 466 of a solenoid 468 mounted within the box section 14. A contractile spring 470 is stretched between an anchorage 472 upon the plunger 464 and an anchorage 474 secured to the pedestal 14. The spring 470 tends to maintain the plunger 464 in its upper position wherein the latch seat 456 is positioned for engagement with the lug 454 of the shear actuating frame. Upon energization of the solenoid 468 the armature 466 and link 464 will be drawn downwardly to release the latch 454, 456 for the purpose described.

Referring now to Fig. 25 it will be seen that the solenoid 468 is connected in series with a switch 476 adapted when in circuit closing position to connect the solenoid across the power lines 368, 370. The switch 476 is shown in Fig. 4 in a position beneath the horizontal portion of the angle 242. In Figs. 26 and 28 the control mechanism for the switch 476 is shown. In said figures a rock shaft 478 extends from the body of the switch 476 and counter-clockwise rotation of the rock shaft 478 is effective to close the contacts (not shown) within the switch 476. A lever 480 is secured to the rock shaft 478 and a spring 482 is stretched between an extension of the lever 480 and a suitable anchorage 484 upon the angle 242. The spring 482 is a contractile spring whose force tends to swing the lever 380 and rock shaft 478 in a clockwise direction to maintain the switch contacts in open position. The lever 480 is provided with an anti-friction roller 486 positioned in the path of a pass-by pawl 488 provided with a seat 490 in which the roller 486 is adapted to fit. The pass by pawl is loosely pivoted at its forward end to a control lever 492 and is supported for longitudinal sliding motion by a bridge 494 secured in spaced relationship below the horizontal leg of the angle 242 by screws 496 extending into a pair of studs 498 spaced from one another a distance slightly greater than the width of the pawl 488. The control lever 492 is pivoted upon a post 500 secured to the angle 242 and is located above the horizontal surface of said angle. The pivotal connection between the lever 492 and pass by pawl 488 therefore comprises a stud 502 extending downwardly from the lever 492 and a screw 504 extending loosely through the end of the pawl 488 and only partially threaded into the stud 502. The pawl 488 is thus capable of limited universal movement relative to the lever 492. The pawl 488 is loosely confined to a path intersecting the roller 486 by the bridge supporting studs 498. A plunger 506 is pivoted at 508 to the control lever 492 and is provided with locking adjustment nuts 510 which confine an expansive spring 512 between said nuts and a flange 513, formed upon the switch body 476 which is perforated to slidably receive the plunger 506. The expansive force of the spring 512 tends to rock the control lever 492 in a counter-clockwise direction as viewed in Figs. 26 and 28. The control lever carries an extension 514 which is biased into the path of the bag mouth 50 by the action of the spring 512. When the leading end of the bag mouth contacts the control lever extension 514 it will rock the control lever 492 in a clockwise direction and will move the pass by pawl 488 rearwardly of the machine and when the trailing end of the bag mouth passes beyond the extension 514 the spring 512 will rock the lever 492 to move the pawl 488 forwardly of the machine.

As shown in Fig. 27 the rear end of the pass by pawl 488 is provided with an upturned portion 516 which serves to cam the pawl 488 upwardly upon rearward movement thereof into contact with the roller 486. Thus, upon rearward movement of the pass by pawl 488 from the position indicated at 488A in Fig. 27 the rear end thereof cams upwardly into the position illustrated in full lines in said figure. Continued rearward motion will position the seat 490 over the roller 486 whereupon the pawl will drop into the position indicated at 488B in Fig. 27. When the roller 486 is thus seated, forward motion of the pawl 488 under influence of spring 512 will cause counterclockwise movement of the lever 480 and rock shaft 478 to move the switch contacts into circuit closing position. The operation of the pawl 488 to thus close the switch 476 is illustrated in Fig. 28 wherein the spring 512 is illustrated as rocking the lever 492 and pulling the pawl 488 forwardly. The seat 490 is shown engaging the roller 486 and the lever 480 is shown in a partially rocked position. Further forward movement of the pawl 488 will result in further rocking of the lever 480 and movement of the roller 486 out of the path of the pawl whereupon the lever 480 will be immediately returned to switch opening position by the spring 482.

As the bag mouth 50 contacts the extension 514 the pawl 488 is moved rearwardly into operative position. Such movement does not, however, have any effect upon the switch 476; it merely serves to condition the control device for operation by the trailing end of the bag mouth. So long as the bag mouth 50 remains in a position to maintain the extension 514 in its rearward position the switch actuating device remains cocked. When the trailing end of the bag mouth 50 passes beyond the extension 514 the lever 492 will be permitted to swing forwardly under the influence of spring 512 to close the switch 476 for a short period of time and to release the switch for return to circuit opening position. The momentary closing of the switch 476 serves to energize the solenoid 468, shown in Fig. 22, whereupon the latch 454, 456 is released to cause operation of the thread chain severing device and release of the sewing head control switch latch 392. It will thus be seen that the actual work done by the bag mouth consists in the compression of the spring 512. This spring may be quite light as it is necessary only for it to overcome the frictional resistance of the pawl 488 and switch 476 together with the contractile force of the spring 482. The various parts may be carefully machined whereby to reduce friction to a minimum and consequently the force required to swing the lever 514 to a position to cock the switch actuating mechanism may be very slight. It is of great importance to so construct a bag actuated trip as to place a very light demand upon the bag mouth. Any heavy frictional drag will tend to crumple or otherwise disarrange the bag mouth and thus to increase the danger of the formation of an imperfect closure. The control lever 384 may also be very light in action as it is necessary only for this lever to move the switch control lever 376 of the switch 366.

The extension 514 is so proportioned relative to the path of the bag through the machine that passage of the bag mouth therebeyond and the subsequent shearing action of the blades 398 and 400 will sever the chain of stitching behind the trailing edge of the bag mouth. The particular length of the extension 514 may of course be varied to proportionately vary the length of the chain of stitching extending rearwardly of the bag mouth.

Thread chain intucking device

It is obvious that a length of thread chain will extend from the point of severance back to the stitch forming mechanism of the sewing head 54 and that the length of this thread chain will be dependent upon the lateral spacing between the chain severing device and the stitch forming mechanism. From a practical standpoint it has been found that the severing device cannot be conveniently located close enough to the sewing head as to limit the length of this thread chain to a length consistent with good appearance of the bag. From the standpoint of appearance, it is desirable that the length of the thread chain and closure tape extending from the leading and trailing ends of the bag mouth should be substantially equal and not more than 1½ to 2 inches in length. It has been found impractical to locate the shearing mechanism sufficiently close to the stitching mechanism as to leave such a short chain for attachment to the leading edge of a succeeding bag. Accordingly, the present invention includes a device for tucking the necessarily overlong thread chain on the leading edge of each bag backwardly into a substantial parallelism with the line of stitching of the bag mouth and substantially coinciding with said line of stitching whereby the thread chain will be entirely concealed by the sealing tape later applied.

Referring now to Figs. 16, 17 and 19, there is illustrated a form of guiding device for tucking the forwardly extending thread chain into the position above described. In each of Figs. 16 and 17 the bag progresses from left to right while in Fig. 19 the bag is progressing rearwardly of the plane of said figure. In Fig. 16 the bag mouth 50 is illustrated in a position wherein the leading end thereof has just entered the intermediate guide 248. A line of stitching 516 is shown in the bag mouth while a chain of stitching and reinforcing cord 518 is shown protruding from the leading end of the bag mouth. For the purposes of illustration the reinforcing cord 520 is illustrated as positioned upon the front face of the bag although it will be understood that such cord may be applied to the rear face or may be applied to both faces, if so desired. It will also be understood that the reinforcing cord may be omitted entirely. The words "thread chain" as used hereinafter are therefore intended to include a chain of stitching thread alone or a chain of stitching thread associated with one or more reinforcing cords.

The thread chain may protrude forwardly or rearwardly of the plane of the bag mouth and may extend upwardly or downwardly from the level of the line of stitches formed in the bag mouth. Accordingly, means are provided to engage the thread chain and turn it rearwardly irrespective of the particular position it may have assumed. As shown in Fig. 16, an inclined guide shoe 522 is supported upon the forward bag feeding roller frame and the inclined face 524 thereof is positioned for engagement with a thread chain 518 which protrudes forwardly of the bag mouth and which extends either upwardly or downwardly of the line of stitching 516. As the bag progresses through the machine the thread chain may engage some portion of the edge 524 or an upper horizontal portion 526 formed upon the guide shoe 522. As shown in Fig. 17 the guide shoe is flared, as at 528, inwardly toward the path of the bag mouth. Below the plane of the portion 526 there is provided a shelf 530 which extends inwardly toward the bag mouth as closely as practicable. As the bag progresses into the vicinity of the flare 528 frictional drag between the thread chain and the portion of the guide shoe with which it engages will bend the thread chain backwardly from the leading end of the bag mouth, and upon further progress of the bag the thread chain will rest upon the shelf 530 in the reversed position illustrated in Fig. 17. A channel 532 having a lower, inwardly extending flange 534 is secured to the guide shoe 522 in such position that the lower flange 534 forms a substantial continuation of the shelf 530. An upper inwardly extending flange 536 of the channel forms a substantial continuation of the upper surface 526 of the guide shoe. Preferably the upper flange inclines downwardly toward the lower flange 534 as illustrated in Fig. 16 in order to urge the thread chain downwardly into alignment with the line of stitching 516 formed in the bag mouth. It will be understood that the shelf 530 and lower flange 534 will be preferably arranged in a position lying just beneath the line of stitching 516. The channel 532 extends in the direction of travel of the bag mouth for a distance sufficient to insure the maintenance of the thread chain in its reversely bent position until such time as the sealing tape will be formed into substantial contact with the bag mouth. The sealing tape will thereafter serve to maintain the thread chain in the position thus assumed.

In Fig. 19 the thread chain 518 is shown in its position within the channel 532. An inspection of this figure will disclose that the tape forming mechanism has started its operation of folding the tape downwardly for contact over the line of stitching and the thread chain 518. In Fig. 18 the bag has progressed to a position wherein the thread chain has passed beyond the channel 534 and wherein the sealing tape has been folded down into a position in which it will serve to maintain the thread chain in its rearwardly tucked position.

In Figs. 14 and 17 there is illustrated an additional channel 538 located on the rearward side of the bag mouth. This channel is provided to control a thread chain which may protrude rearwardly of the bag mouth and is substantially identical in design and support to the channel 532. The supporting structure 252 for the intermediate guide 248 is provided with an inclined edge 540 similar to the edge 524 of the forward guide shoe 522 (see Fig. 16) to turn a rearwardly protruding thread chain backwardly upon the rear face of the bag mouth 50. It will be understood that when a reinforcing cord 520 is placed on the forward face of the bag mouth, this cord will be bent around the leading end of the bag mouth and will extend backwardly in close proximity with the line of stitching 516.

In Figs. 15 and 19 the front channel 532 and the rear channel 538 are shown in relationship to the other parts of the machine. The operation of the rearward channel 538 has not been shown in the drawings since it will be clearly understood from the above description. While in the above description it has been stated that the thread chain 518 might extend upwardly from the level of the line of stitching 516 it will be appreciated that such extension will be quite unlikely to occur. The thread chain with or without a reinforcing cord will be more or less flexible and under ordinary circumstances will tend to extend downwardly as shown in Fig. 16. If the thread chain should extend downwardly and should protrude directly forward of the bag mouth the shelf 530 will engage and turn the thread chain backwardly. If the thread chain should extend upwardly it will be engaged by the leading edge of the upper channel flange of either the front or rear channel. If by chance the thread chain should protrude in such manner as to engage none of the edges the downward inclination of the upper flanges of the channels 532 and 538 will produce sufficient friction upon the chain to turn it backwardly after it has entered one or the other of said channels.

From the above description it will be seen that there is provided a plurality of stationary elements against one or more of which the thread chain will necessarily be engaged. It is only necessary that the chain engage any one of these elements in order that it may be turned backwardly and guided by the channels into the desired position.

Tape applying mechanism

Referring back to Fig. 1 there is shown a tape supply spool 542 which is mounted for rotation upon a suitable bracket 544 supported on the frame of the machine. The tape 546 is of sufficient width to be creased longitudinally of its center line and to extend downwardly on either side of the bag mouth for a distance sufficient to completely cover the line of stitching and to provide sufficient area for secure adhesion to the walls of the bag mouth. A brief reference to Fig. 29 will disclose the tape 546 in its final position upon a completed bag closure. Referring now to Fig. 4 the tape 546 is conducted through a suitable adhesive applying device 548 which may comprise an adhesive supply well 550 in which a suitable quantity of adhesive may be maintained. A dip roller 552 is arranged to dip into the adhesive within the well 550 while a cooperating spring mounted pressure roller 554 is adapted to press the tape 546 into contact with the upper surface of the dip roller 552. Adhesive is transferred from the well to one face of the tape 546 by the cooperating rollers 552 and 554 in an old and well known manner. From the adhesive applying rollers the tape is guided over a suitable guide roller 556 rotatably mounted upon the adhesive well body 550. The tape 546 is then conducted through a guide tube 558 of suitable rectangular cross section supported upon a bracket 560 rotatably carried by a fixed bracket 562 mounted upon the machine frame. Rotation of the bracket 560 relative to the frame is provided for the purposes of adjustment of the guide tube 558 into proper alignment with the tape. From the tube 558 the tape 546 is conducted around a freely rotatable guide roller 564 mounted upon brackets 565 to be hereinafter described, and is turned by this roller into a generally horizontal position overlying the path of the bag mouths with the adhesive carrying side facing downwardly.

Referring to Figs. 14 to 19 the tape former will now be described. The tape former comprises an inverted generally U-shaped channel whose walls progressively converge upon one another from a substantially flat condition at the introductory end shown in Fig. 15 to the closely converged condition at the trailing end illustrated in Fig. 18. The main body of the tape former is indicated by the reference numeral 566 and the outer edges thereof are preferably turned inwardly upon themselves to form guide flanges 568 within which the edges of the tape are supported and guided. As shown in Fig. 14, the tape 546 is conducted from the guide roller 564 into the leading end of the tape former 566 and at this point is substantially transversely flat. Reference to Fig. 15 will disclose that the leading end of the tape former 566 is provided with an upwardly flared lip 570 to facilitate passage of the tape into the former. The former 566 is supported by mechanism to be hereinafter described in a downwardly inclined position in which the trailing end is yieldably urged into contact with the top of the bag mouth 50 whereby as the tape is progressively bent along its longitudinal center line it is also progressively projected downwardly into contact with the top of the bag mouth. Thus, in Fig. 19 the tape 546 is illustrated as partially bent along its longitudinal center and has partially moved downwardly toward the bag mouth while in Fig. 18 the tape has been sharply creased along its longitudinal center and has been projected downwardly into contact with the upper edge of the bag mouth.

The tape feeding rollers 198 and 230 are supported upon their vertical drive shafts 196 and 232 respectively at a fixed horizontal spacing such that the thickness of the tape alone will be insufficient to fill the gap between the feeding rollers and consequently the constant rotation of said rollers will be ineffective to produce movement of the tape alone. However, when a bag mouth is progressed through the tape forming station and into the tape feeding rollers the combined thickness of the bag mouth and the doubled tape will be sufficient to fill the gap between the rollers 198 and 230 whereupon said rollers will be effective to grip and feed the bag mouth and tape positioned thereon. Preferably, the rollers 198 and 230 are annularly grooved as indicated at 572 in a vertical position coinciding with the vertical position of the line of stitching applied to the bag mouth. These annular grooves are provided to relieve the pressure along the line of stitching and to permit the rollers 198 and 230 to grip and apply pressure to the portions of the bag mouth and sealing tape lying above and below such line of stitching.

The mechanism thus described provides for automatic application of tape to a bag mouth as the same progresses through the tape applying station and provides for feeding of the taped bag mouth while avoiding the feeding of tape alone.

Tape former support

The tape former is supported by mechanism which is designed to facilitate removal of the tape former for cleaning and for threading tape therethrough when it is necessary to start a new supply roller 542 of tape into the machine. To this end, as shown particularly in Figs. 13 and 14, the leading end of the tape former 566 is pivotally supported upon a shaft 574 passing through a boss 576 formed upon a casting 578, to which the tape former 566 may be secured as by screws 580, and into a boss 582 formed upon the bracket 260. A locking pin 584 extends through the boss 582 and into the opening therein which receives the shaft 574. The shaft 574 is formed with an annularly reduced portion 586 and an axially extending slot 588 extending from the reduced portion 586 to the rear end of the shaft 574. The forward end of the shaft 574 is provided with a handle 590. The shaft 574 is adapted to be inserted through the boss 576 and, with the slot 588 aligned with the pin 584, the shaft may be projected through the boss 582. If the shaft 574 be turned to move the slot 588 out of alignment with the pin 584 the shaft 574 is thereupon locked in position to pivotally support the tape former.

The casting 578 extends along the upper surface of the former 566 and terminates at its trailing end in a forked extension 592 having an open ended slot therein of a width substantially conforming to the diameter of a plunger 594 having an enlarged head 596 adapted to be positioned beneath the forked extension 592 to serve as a support for the trailing end of the tape former 566. The plunger 594 has an enlarged collar 598 thereon which is secured to the lower end of a leg 600 of a U-shaped handle 602. The leg 600 and collar 598 extend through a boss 604 formed upon the bracket 260. The inner surface of the boss 604 is threaded to receive an externally threaded sleeve 606 whose inner bore is of a diameter to permit the leg 600 to freely slide therethrough. An expansive spring 608 is confined between the lower end of the sleeve 606 and the upper surface of the collar 598 and this spring serves to resiliently urge the tape former 566 downwardly toward the bag mouth. The bag feed roller support plate 258 is chamfered as shown at 610 in Fig. 14 and this chamfered portion serves as a limiting stop in the absence of a bag. The spring 608 is relatively light and is adapted to yield upwardly when a mouth 50 of a bag is progressed through the tape forming station. Thus, the tape is resiliently urged downwardly into contact with the upper edge of the bag mouth. The brackets 565 may conveniently be formed as a part of the casting 578 in order that the tape former 566 and guide roller 564 may be removed from the machine as a unit.

Since, as pointed out above, it is desirable to remove the tape former 566 on relatively frequent occasions, specific provisions have been made for locking the spring 608 and elevating the trailing end of the tape former to a position in which it may be withdrawn to the right as viewed in Fig. 14 upon removal of the pivot shaft 574. From an inspection of Figs. 14 and 15 it will be seen that under the influence of spring 608 the trailing end of the tape former is pressed downwardly into such position as to prevent horizontal withdrawal, and it is obvious that it would be difficult to align the forked extension 592 with the plunger 594 if it were attempted to insert the tape former into the machine. Accordingly, the handle 602 has threaded on the lower end of the leg 612 thereof a sleeve 614 which may be locked in adjusted position upon the threaded end of the leg 612 by a suitable lock nut 616. A shelf 618 is formed upon the bracket 260 and the upper surface of this shelf is substantially above the upper surface of the portion 620 upon which the boss 604 is formed. Thus, while the handle 602 is in the position illustrated in Fig. 14 the spring 608 is free to press the tape former downwardly for the purpose described, the lower end of the sleeve 614 being adjusted to permit ample downward movement for this purpose. The handle 602 may be grasped and pulled upwardly against the spring 608 to bring the lower end of the sleeve 614 to the level of the shelf 618. The handle may then be rotated into the dotted line position illustrated in Fig. 13 to rest the lower end of the sleeve 614 upon the shelf 618. This upward movement and the resting of the sleeve 614 upon the shelf 618 to lock the handle 602 in its upward position will result in lifting of the trailing end of the tape former to a substantially horizontal position. If the shaft 574 be now removed the tape former may be drawn to the right and thus removed from the machine while the plunger 594 remains stationary and free from influence of the spring 608. The tape former may be replaced by moving the same in a horizontal plane to the left as viewed in Fig. 14 and aligning the forked extension 592 in proper relationship with the plunger 594 and head 596 thereof. The shaft 574 may now be replaced and the handle 602 may be rotated to remove the sleeve 614 from the shelf 618 and thus free the spring 608 to urge the tape former downwardly into its operative position.

*Tape feeding roller support*

The tape feeding rollers 198, 230 engage and grip the tape 546 in its sealing position upon the bag mouth. Since the tape has had adhesive applied to one side thereof by the means above described the rollers 198 and 230 are very likely to become fouled with adhesive. Occasional breakage of the tape and occasional formation of defective closures make it desirable that the feeding rollers may be separated for rearrangement of the tape or for cleaning the rollers. It may also be desirable to separate the rollers when a new tape is being threaded into the machine. Accordingly, the present invention includes a supporting means for the front tape feeding roller 230 which is pivoted in such manner as to permit separation of the roller 230 from the roller 198. Supporting means according to the present invention is disclosed in Fig. 13.

As shown in Fig. 13, the front tape feeding roller shaft 232 is rotatably supported in suitable bearings in a pivoted frame work comprising an upper arm 622 and a lower arm 624 (see Fig. 4) formed upon a tubular bearing member 626 within which the shaft 232 is freely rotatable. The arms 622 and 624 are pivoted upon a vertical stub shaft 628 carried in a suitable bearing upon the bracket 260. The axis of the pivot 628 is preferably located in substantial vertical alignment with the axis of the front bag feeding roll 254 which is nearest to the tape feeding roller 230. The upper arm 622 is formed with an extension 630 beyond the pivot 628 and the extension 630 is formed with a depression 632 adapted to receive the rounded nose 634 of a spring pressed plunger 636. The plunger 636 is slidably mounted within a barrel 638 pivoted upon a stud 640 passing through an ear 642 formed upon the barrel. An expansive spring 644 is confined within the barrel 638 between the plunger 636 and an adjustable set screw 646 threadably received in one end of the barrel. A suitable lock nut 648 may be provided to secure the screw 646 in adjusted position. The plunger 636 has formed adjacent its rounded end 634 a groove 650 which is adapted to receive the end of a pin 652 extending through the barrel. The groove 650 is of limited length whereby the pin 652 may serve to retain the plunger within the barrel against the force of the spring 644. A handle 654 is formed upon the barrel 638 and extends forwardly of the machine into a position for convenient acess.

As shown in full lines in Fig. 13, the front tape feeding roller shaft 232 is adapted to be urged toward the rear tape feeding roller shaft 196 by the action of the spring 644 working through the plunger 636 when the same is seated within the depression 632 in the arm extension 630. When it is desired to separate the front tape feeding roller from the rear tape feeding roller the handle 654 may be grasped and the barrel 638 pivoted about the stud 640 into the dotted line position illustrated in Fig. 13. In this latter position the spring pressed plunger 636 is removed from the arm extension 630 and the entire front tape feeding roller frame may be freely rocked about the shaft 628 into the dotted line position illustrated in Fig. 13. Since, as above described, the axis of the shaft 628 is in substantial vertical alignment with the front bag feeding roller 254 nearest to the tape feeding roller, it will be understood that the sprocket chain 264 may follow the shaft 232 and the sprocket wheel 240 thereon in the course of the movement above described.

As above described, the tape feeding rollers 198 and 230 are not spring pressed into engagement with one another but are maintained at a fixed minimum spacing. As shown in the present disclosure, this minimum spacing may be established by the size of the intermeshing gears 236 and 234. As shown in Figs. 13 and 7, when the front tape feeding roller 230 is urged toward the tape feeding roller 198 by the spring 644 the teeth of gears 234 and 236 meet and intermesh to the limit established by the length of the teeth. The gears 234 and 236 may be so selected that the spacing between the rollers 198 and 230 illustrated in Fig. 7 will be of the desired extent.

*Tape severing device*

As the leading end of the bag mouth 50 progresses through the tape applying device above described it engages a control lever 656 (see Fig. 26) pivoted at 658 upon the angle 242. Movement of the leading end of the bag mouth will serve to rock the control lever 656 in a clockwise direction as viewed in Fig. 26 until the lever 656 has been moved out of the path of the bag mouth. The lever 656 is formed with an angularly disposed extension 660 which is formed by cutting a relatively large notch 662 in the body of the lever 656. The notch 662 is provided for clearance of certain portions of the tape shearing blades to be hereinafter described. The point of intersection between the angular extension 660 and the body of the lever 656 is indicated at 664 and this point of intersection will be yieldably pressed against the rear face of the bag mouth 50 as the same progresses through the zone of operation of the lever 656 by the action of a spring 666. The spring 666 operates through a plunger 668 which may be identical with the plunger 506 described above in connection with the thread chain severing device control mechanism. The control lever 656 has pivoted thereto a pass by pawl 670 which may be identical to the pass by pawl 488. Upon clockwise movement of the lever 656 above described the pass by pawl 670 is moved rearwardly to engage the seat 672 thereof with a roller 674 carried by a switch control lever 676 which is biased by a spring 678 into circuit opening position. As the bag mouth progresses through the machine and the rear end thereof passes beyond the point of intersection 664 upon the lever 656 the lever will be released for counterclockwise movement under the influence of spring 666. The angular extension 660 will ride across the trailing end of the bag mouth whereupon the switch control lever 676 will be operated to close the contacts within the switch body 680. This control mechanism has not been described in full detail as it is preferably identical with the switch control mechanism provided for the thread chain severing device which has been fully described hereinabove.

Referring now to Fig. 25, the switch 680 is shown in series with a solenoid 682 which may be identical with the solenoids 354 and 468. As shown in Fig. 25, closure of the contacts of the switch 680 will connect the solenoid 682 across the power lines 368 and 370.

In Fig. 23 the solenoid 682 is illustrated within the box section of the pedestal 14. An armature 684 is associated with the solenoid 682 and is pivotally carried at the lower end of a plunger 686 which is urged upwardly by spring 688 stretched between an anchorage 690 upon the plunger 686 and an anchorage 692 secured to the pedestal 14. At its upper end the plunger 686 is pivoted at 694 to a rock arm 696 fixed for rotation with a rock shaft 698.

Referring now to Figs. 8 to 12, inclusive, the rock shaft 698 has fixed thereon a rock arm 700 having a slot 702 formed in its free end adapted to receive a pin 704 carried upon the rearward end of a latch lever 706. The latch lever 706 is pivoted at its forward end upon a stud 708 secured to a supporting plate 710 which forms a vertical leg of an angle whose horizontal leg is indicated at 712 and which is supported upon the angle 242. The latch lever 706 has a notch 714 formed therein for reception of a stud 716 carried by a shear actuating frame 718 which is preferably identical with the shear actuating frame described above in connection with the thread chain severing device. The mechanism thus described provides a means for latching the shear actuating frame in its cocked position and it will be understood that energization of the solenoid 682, when the contacts of switch 680 are moved to circuit closing position, will result in downward movement of the plunger 686 to rock the shaft 698 in a clockwise direction as viewed in Fig. 8 to release the latch seat 714 from the lug 716 whereupon the shear actuating frame 718 may be projected forwardly under the influence of springs 720, 722 to rock a movable shear blade 724 about its pivot 726 into shearing relationship with a fixed shear blade 728. The mechanism and operation just described are substantially identical with that heretofore described in connection with the thread chain severing device.

The tape severing device preferably includes a pivoted guard 730 which is biased by a spring 732 into a position paralleling the edge of the fixed shear blade 728 as shown in Figs. 8 and 10. Upon rearward movement of the movable shear blade 724 the guard 730 will be moved rearwardly to permit shearing as illustrated in Fig. 10.

The mechanism for setting the shear actuating frame 718 into cocked position will now be described. It will be understood that the mechanism to be described is identical with the mechanism availed of to set the thread chain severing device into cocked position and as stated above detailed description of such mechanism has been deferred to the present time. In Fig. 5, a bevelled gear 734 is shown keyed upon the vertical drive shaft 172 which is rotated through the speed reducer 80. A meshing bevelled gear 736 is keyed to a horizontal shaft 738. Since, as above described, the vertical drive shaft 172 rotates constantly, so long as the main clutch 84 remains engaged, it is apparent that the shaft 738 will be similarly constantly driven.

Referring back to Figs. 8 to 12, inclusive, the shaft 738 has mounted thereon for rotation therewith a cam 740 which may conveniently be an eccentrically positioned circular disk. The cam 740 is secured by a feathering key or spline 741 for rotation with the shaft 738 and for axial movement along said shaft. A cam 742 is fixed to the cam 740 for rotation and sliding movement therewith. The cam 742 may comprise a generally concentric collar 744 upon which is formed a radially extending segmental cam portion 746 which has a helically inclined cam face 748 and a radial cam face 750. Interposed between the cam 742 and the cam 740 is a concentric collar 752 which serves merely to space the cams 740 and 742 apart. The cams 740 and 742 and the collar 752 are secured together for rotation as a unit and thus constitute a cam group.

A post 754 carrying at its upper end an antifriction roller 756 is secured to the horizontal web 712 of the supporting bracket. The roller 756 is disposed for cooperation with the radial and helical cam faces 750 and 748 of the cam 742. A bell crank 758 is pivoted at 760 upon the web 712 and includes an arm 762 projecting into the path of the bridge 764 of the shear actuating frame. The other arm 766 of the bell crank 758 has yieldably mounted thereon an extension 768 which is perforated at 770 to receive a bolt 772 passing freely through the arm 766 and secured thereto by a nut 774. An expansive spring 776 yieldably urges the extension 768 into a position in which it forms a substantial continuation of the arm 766. At its outer end the extension 768 is bifurcated to form a yoke 778 straddling the shaft 738 and extending into operative relation with a ring 780 formed upon the cam group 740, 748.

When the shear actuating frame is moved forwardly under the influence of its springs 720 and 722 to perform a shearing operation the bridge 764 thereof will engage the arm 762 of the bell crank 758 to rock the bell crank in a counterclockwise direction as viewed in Fig. 11 and to move the cam group 740, 742 axially of the shaft 738. The extent of this axial movement is limited by a spacing collar 782 extending from the vertical plate 710 for a suitable distance. The axial movement of the cam group thus described will position the cam 740 for cooperation with a roller 784 mounted upon the rear bridge 786 of the shear actuating frame. Rotation of the shaft 738 in the direction indicated by the arrow in Figs. 8 and 11 will cause the cam 740 to move the follower roller 784 radially of the shaft 738. This radial movement will result in rearward movement of the entire shear actuating frame against the force of springs 720 and 722. The cam 740 is so proportioned as to bring the lug 716 into seating engagement with the notch 714 in the latch lever 706 which thereupon rises under the influence of spring 688 into latching engagement with the lug 716 whereupon the shear actuating frame is set in cocked position.

Continued rotation of the shaft 738 will bring the helical portion 748 of the cam 742 into engagement with the roller 756 on the fixed stud 754. The reaction between the roller 756 and cam surface 748 will force the cam group 742, 740 axially of the shaft and will thus move the eccentric cam 740 out of the path of the follower roller 784. Since, in its cocked position the bridge member 764 of the shear actuating frame is moved rearwardly, as shown in Fig. 11, the bell crank 758 will be free to rock in a counterclockwise direction as the cam group thus moves axially of the shaft 738.

The cam group will remain in the thus described position until the latch lever 706 is depressed for actuation of the shear. Immediately upon forward motion of the shear actuating frame the bell crank 758 is again rocked in counter-clockwise direction to reposition the cam 740 for cooperation with the follower 784. The yieldable mounting of the extension 768 of the bell crank 758 is provided to permit the cocking apparatus above described to operate properly irrespective of the exact moment of release of the shear actuating frame. Since the shaft 738 is constantly rotating it is obvious that the helical portion 748 or radial portion 750 of the cam 742 might be in any angular position when the bell crank 758 is rocked. If one of these portions of the cam is arranged in axial alignment with the roller 756 it is obvious that the cam group cannot be moved at this moment into operative position. Accordingly, under such circumstances the bell crank 758 will complete its counterclockwise movement but the extension 768 will not be permitted to complete its movement and thus the arm 766 will move away from the extension 768 to compress the spring 776. The extension 768 will thereafter be fulcrumed about its forward end 767 and will be urged by the spring 776 to rock in a counter-clockwise direction. As soon as the radial portion of the cam 742 passes out of axial alignment with the roller 756 the spring 776 will be effective, through the extension 768, to axially shift the cam group into operative position. Similarly, the yieldable extension 768 provides for appropriate delay in the event that the bell crank 758 attempts to move the cam group into operative position when the high portion of the eccentric cam 740 is in overlapping relation with its follower 784. In such event the radial side of the cam 740 will be brought into abutment with the radial side of the roller 784 and the spring 776 will thereafter become compressed and will be effective to complete the axial shifting of the cam group when the cam 740 has been rotated into position wherein it may be moved into radial alignment with its follower 784.

The cocking mechanism illustrated in Figs. 20 and 21 for the thread chain severing devices 62 is identical with that described above in connection with the tape severing device. The shaft 738 extends into a suitable bearing 790 secured to the vertical plate 404 of the thread chain severing device supporting bracket. A cam group 792 is splined to the shaft 738 and a follower 794 is arranged upon the rear bridge 440 described in detail above. A bell crank 796 is pivoted at 798 upon the web 406 and its operation is identical with that of the bell crank 758 above described.

From the above detailed description of the severing devices 62 and 64 and the control means respectively provided for the same, it will be understood that the leading end of the bag mouth 50 conditions the control levers located in the path of the bag mouth and that the trailing end of the bag mouth causes operation of the control means to energize the solenoids for releasing the severing devices to the action of their energy storing springs whereupon the thread chain or the tape is severed. It will be further understood that the constantly rotating cocking or resetting mechanism is moved to operative position by the operative stroke of the severing devices whereupon the energy storing springs are immediately cocked or reset and are latched in such position ready for severing operation upon the next succeeding thread chain or tape.

Tape squeezing rollers

The tape squeezing rollers 60 and the means for driving the same and for resiliently urging the respective pairs 184, 200 and 188, 216 of such rollers into squeezing relationship have been described above. These rollers are located as shown in Figs. 1 and 4 in a position along the bag path immediately following the tape severing device 64 and as the leading end of a bag mouth proceeds from the tape feeding rollers 198 and 230 through the cocked tape severing device 64 it will enter the bite of the tape squeezing rollers and will be thereafter progressed out of the machine.

Each of the tape squeezing rollers 184, 188, 200 and 216 is provided with an annular groove 800 which serves to accommodate the extra thickness of the bag closure along the line of stitching whereby the peripheral surfaces of the squeezing rollers may exert pressure upon those portions of the tape lying above and below said line of stitching.

Operation

The operation of the several elements of the machine herein disclosed has been described in connection with the detailed description thereof. The operation of the machine as a whole will therefore be but briefly reviewed.

The sewing head is threaded with suitable sewing thread and reinforcing cord if the latter be desired and a roll of tape 546 is positioned in the machine. The tape is threaded through the adhesive applier and is threaded into the tape former 566 which may be removed from the machine as above described for this purpose. The threaded tape former may be replaced in the machine. The driving motor is now started and the machine is ready for operation.

A filled bag 48 whose open mouth has been collapsed to bring the front and rear walls of the mouth together and in which the gussets, if the gussetted type of bag is used, have been tucked inwardly and the mouth has been collapsed upon such gussets, is placed upon the conveyor 46. The operator of the machine guides the bag mouth 50 into the guide 52 and preferably manually assists the bag mouth in its progress through the guide 52. The conveyor 46 progresses the bag through the guide 52 and the leading end of the bag mouth is brought into contact with the control lever 384 which is moved to the dotted line position of Fig. 26 to start the sewing head. The leading end of the bag mouth then is engaged by the stitching mechanism 55 of the sewing head and a line of stitching is progressively applied through said bag mouth as it moves through the sewing head. In normal operation a thread chain 518 will have been previously formed by said sewing head and will be of a length equal to the distance between the stitching mechanism 55 and the thread chain severing device 62. This thread chain 518 will become attached to the leading end of the bag mouth and will proceed therewith through the machine. The thread chain severing device will be in its cocked position wherein the shear blades thereof are opened and the bag mouth may progress therebetween. The leading end of the bag mouth enters the intermediate guide 248 and is guided thereby into proper alignment with the tape applying station. As the bag mouth enters the tape applying station the thread chain 518 will be engaged by one or more of the thread chain intucking devices described above and will be turned backwardly into a position generally parallel with and closely coinciding with the line of stitching 516. The leading end of the bag mouth then progresses through the tape former 566 and into the fixed spacing between the tape feeding rollers 198 and 230. The combined thickness of the bag mouth 50 and the folded tape 546 will fill the space between the tape feeding rollers and the rotation thereof will serve to progress the taped bag mouth through the cocked tape severing device 64 and into the bite of the tape squeezing rollers 188 and 216.

From a consideration of Fig. 4 it will be apparent that the point of severance of the tape by the severing device 64 is somewhat in advance of the tape feeding rollers 198, 230. The length of tape extending from the active portions of the tape feeding rollers to the point of severance will extend forwardly of the leading end of the bag mouth since the gripping and feeding operation of the rollers 198 and 230 occurs along a line substantially coinciding with a line extending horizontally through the axes of the tape feeding rollers. The leading end of the bag mouth with the tape projecting forwardly therefrom will thus enter the tape squeezing rollers as above described.

As the trailing end of the bag mouth passes the extension 514 of the control lever 492, the lever 492 will be moved forwardly as viewed in Fig. 26 to cause operation of the thread chain severing device and to cause stopping of the sewing head. As the trailing end of the bag mouth passes beyond point 664 of the control lever 656 the lever will move forwardly as viewed in Fig. 26 to cause operation of the tape severing device. The tape severing device control lever is preferably so positioned as to sever the tape at a distance behind the bag mouth substantially equal to the length of tape extending forwardly of the leading end of the bag mouth in order that the tape will be symmetrically positioned over the closure.

In Fig. 29 a completed bag closure is illustrated. The line of stitching 516 is shown and the thread chain 518 is shown in its backwardly tucked position. A forwardly extending portion of sealing tape is identified at 802 and a rearwardly extending portion of tape substantially equal in length to the portion 802 is identified at 804. It is preferred to sever the thread chain 516 at a distance behind the bag mouth substantially equal to the length of the tape extensions 802 and 804 in order that the line of stitching will be completely concealed by the tape. The lengths of the tape extensions 802 and 804 and the rearwardly extending thread chain may be determined by proper positioning of the severing devices and their control levers as above described.

From the above detailed description it will be apparent that the machine herein disclosed accomplishes the objects of the invention. It provides for the formation of tight efficient closures of uniform appearance upon the mouths of filled bags. The machine is adapted to form such closures upon a succession of bags presented thereto in any irregular or haphazard manner which circumstances require. It is also obvious that a machine will be equally effective to form identical closures upon bags which may have been presented thereto in definite timed relationship. In any event the operation of the sewing head and the tape applying means is entirely dependent upon the passage of the bag through the machine. Accordingly, there will be no waste of sewing thread or reinforcing cord or of sealing tape applied thereover. The machine is normally intended to be continuously driven but it may be stopped upon the occurrence of an emergency by depression of the foot treadle 66. Such emergency stop may be made irrespective of the position of the bag within the closing apparatus. The control devices for the various stations of the machine are all adapted to be operated without any danger of defacing or disrupting the bag mouth since the actual work done by the bag mouth is limited to the actuation of electric switches.

It will be obvious to those skilled in the art that numerous changes and variations in the specific details of the invention may be made without departing from the essential teaching thereof. The invention is not therefore limited to the details of the illustrative example given hereinabove but may variously be embodied within the scope of the claims hereinafter made.

I claim:

1. In a machine for closing the collapsed mouth of a filled bag, the combination of a continuously moving conveyor; an intermittently operable sewing head to form a line of stitching in the mouth of said bag when the same is progressed through said sewing head by said conveyor; sensing means interposed in the path of said bag mouth in advance of said sewing head; means operable by said sensing means upon contact of the leading end of said bag mouth with said sensing means for initiating operation of said sewing head; means for severing the line of stitching in said bag mouth at a predetermined distance behind the trailing end thereof; a second sensing means independently operable; means for biasing said second sensing means into the path of said bag mouth in a position beyond said sewing head, said second sensing means being movable by the leading end of said bag mouth against said biasing means; a control device and means operable upon movement of said second sensing means for connecting said biasing means to said control device to operate said control device upon the passage of the trailing end of said bag mouth beyond said second sensing means; and means under the control of said control device for causing operation of said severing means for stopping operation of said sewing head.

2. In a machine for closing the collapsed mouth of a filled bag, the combination of a conveyer for progressing said bag, a sewing head, first sensing means displaceable by the leading end of the collapsed bag mouth an deffective to initiate operation of said sewing head and effective after disengagement from the trailing end of said collapsed bag mouth following passage thereof to stop operation of said sewing head, means for severing said line of stitching at a predetermined distance behind the trailing end of said bag mouth, means for actuating said severing means, second sensing means independently operable by the leading end of said bag mouth and effective to condition said severing mechanism actuating means preparatory to severing of the stitching and effective upon disengagement from the trailing end of said bag mouth after passage thereof to initiate operation of said severing mechanism actuating means to thereby sever the stitching, latch means associated with said first sensing means and effective upon displacement thereof under the influence of the leading end of said bag mouth to maintain said first sensing means in displaced position, and means associated with said severing mechanism for releasing said latch means to thereby permit return of said first sensing means to the initial position thereof and to effect stopping of said sewing head.

3. In a machine for closing the collapsed mouth of a filled bag, the combination of a conveyer for progressing said bag, a sewing head, first sensing means displaceable by the leading end of said collapsed bag mouth, a control device associated with said sensing means and effective to initiate operation of said sewing head upon displacement of said sensing means and effective after disengagement of the bag and sensing means to initiate stopping of said sewing head, means for severing said line of stitching at a predetermined distance behind the trailing end of said bag mouth, means for actuating said severing means, second sensing means independently operable by the leading end of said bag mouth and effective to condition said severing mechanism actuating means preparatory to severing of the stitching and effective upon disengagement from the trailing end of said bag mouth after passage thereof to initiate operation of said severing mechanism actuating means to thereby cause the stitching to be severed, latch means associated with said first sensing means and effective upon displacement thereof under the influence of the leading end of said bag mouth to maintain said first sensing means in displaced position and to thereby maintain said control device in operation initiating position, and means associated with said severing mechanism for releasing said latch means to thereby permit return of said first sensing means to the initial position thereof and to permit said control device to become effective to stop operation of said sewing head.

HOWARD G. ALLEN.